United States Patent
Ericson et al.

(10) Patent No.: US 8,693,363 B2
(45) Date of Patent: Apr. 8, 2014

(54) SYSTEMS AND METHODS FOR TIME DIVISION MULTIPLE ACCESS COMMUNICATION WITH AUTOMATIC REPEAT REQUEST ERROR CONTROL

(75) Inventors: Daniel W. Ericson, Hollis, NH (US); Jun Ni, Liberty Lake, WA (US); Albert J. Bruso, Templeton, MA (US)

(73) Assignee: Harris Corporation, Melbourne, FL (US)

( * ) Notice: Subject to any disclaimer, the term of this patent is extended or adjusted under 35 U.S.C. 154(b) by 188 days.

(21) Appl. No.: 13/187,559

(22) Filed: Jul. 21, 2011

(65) Prior Publication Data

US 2013/0021924 A1    Jan. 24, 2013

(51) Int. Cl.
G06F 11/00    (2006.01)

(52) U.S. Cl.
USPC .......................................... 370/252; 714/748

(58) Field of Classification Search
None
See application file for complete search history.

(56) References Cited

U.S. PATENT DOCUMENTS

| | | |
|---|---|---|
| 5,757,787 A | 5/1998 | Dent |
| 6,009,553 A | 12/1999 | Martinez et al. |
| 6,014,375 A | 1/2000 | Janky |
| 6,438,121 B1 | 8/2002 | Hammons, Jr. et al. |
| 7,085,282 B2 | 8/2006 | Belotserkovsky et al. |
| 7,215,652 B1 | 5/2007 | Foley et al. |
| 7,924,765 B2 | 4/2011 | Chen et al. |
| 2002/0080719 A1* | 6/2002 | Parkvall et al. ............... 370/235 |
| 2003/0039229 A1 | 2/2003 | Ostman |
| 2004/0208183 A1* | 10/2004 | Balachandran et al. . 370/395.21 |
| 2005/0180350 A1 | 8/2005 | Kolor et al. |
| 2006/0041815 A1 | 2/2006 | Haymond |
| 2006/0182030 A1 | 8/2006 | Harris et al. |
| 2008/0025341 A1 | 1/2008 | Rao et al. |
| 2008/0075106 A1 | 3/2008 | McDonald et al. |
| 2009/0197630 A1* | 8/2009 | Ahn et al. ..................... 455/522 |
| 2011/0182301 A1 | 7/2011 | Ericson et al. |

OTHER PUBLICATIONS

Information about Related Patents and Patent Applications, see section 6 of the accompanying Information Disclosure Statement Letter, which concerns Related Patents and Patent Applications.

* cited by examiner

Primary Examiner — Andrew Chriss
Assistant Examiner — Peter Mak
(74) Attorney, Agent, or Firm — Fox Rothschild LLP; Robert J. Sacco

(57) ABSTRACT

Systems (100, 200) and methods for providing TDMA communication. The methods involve determining a channel quality of an uplink channel. A communication delay is set equal to an integer value "K". "K" is selected based on the channel quality. "K"≤"N". "N" is a total number of frames of a time slot of a TDMA signal (400). Thereafter, First Message Data (FMD) is communicated over the uplink channel in a first time slot ($A_1$) of an uplink signal (1000, 1100, 1200, 1400, 1500, 1600). An Error Control Process (ECP) is performed using FMD to at least identify First Error Free Message Data (FEFMD). Filler data and/or at least a portion of FEFMD is communicated over a downlink channel in a last "N–K" frames of a time slot ($A_1$) of a downlink signal (1050, 1150, 1250, 1450, 1550, 1650), when "K"<"N".

24 Claims, 15 Drawing Sheets

SYSTEMS AND METHODS FOR TIME DIVISION MULTIPLE ACCESS COMMUNICATION WITH AUTOMATIC REPEAT REQUEST ERROR CONTROL

BACKGROUND OF THE INVENTION

1. Statement of the Technical Field

The inventive arrangements relate to communication systems, and more particularly to systems and method for providing Time Division Multiple Access (TDMA) voice communication and/or eXtended TDMA (XTDMA) voice communication.

2. Description of the Related Art

Conventional communication systems typically comprise a plurality of Mobile Terminals (MTs) communicatively coupled to each other via Base Stations (BSs) and a network. During operations, a first MT generates a voice message which is to be communicated to a second MT. The voice message is encoded using an Error Detection (ED) code. The coded voice message is transmitted from the first MT to a BS during pre-defined time slots of a signal. The pre-defined time slots will be referred to below as time slots $A_1, \ldots, A_N$. Each time slot $A_1, \ldots, A_N$ includes a plurality of frames of coded message data. Each frame includes a plurality of sub-frames. For purposes of ease of discussion, it is assumed that each time slot included four (4) frames $F_1, \ldots, F_4$ of coded voice message data, and that each frames includes four (4) sub-frames $f_1, \ldots, f_4$. Each sub-frame $f_1, \ldots, f_4$ includes payload data encapsulated between trailers and headers. The payload data includes a plurality of information bits defining at least a portion of the coded voice message.

At the BS, the coded message data of each frame $F_1, \ldots, F_4$ of a time slot (e.g., time slot $A_1$) is processed to determine if errors exist therein. This processing can involve performing a conventional Automatic Repeat Request (ARQ) error control technique. One conventional ARQ error control technique generally involves decoding the coded message data of each frame $F_1, \ldots, F_4$ of the time slot (e.g., time slot $A_1$). Thereafter, a determination is made as to whether errors exit in the decoded message data.

If errors do not exist in the decoded message data, then the BS sends to the first MT an acknowledgment message indicating that the message data contained in the four (4) frames $F_1, \ldots, F_4$ of the time slot (e.g., time slot $A_1$) is error free. The BS also forwards the four (4) frames of data $F_1, \ldots, F_4$ to the second MT during a particular time slot of the signal (e.g., time slot $A_1$).

If errors do exist in the decoded message data, then the BS either discards the decoded message data (i.e., no message data is sent from BS in time slot $A_1$) or temporally stores the decoded message data for later user in a data combining process. The BS also sends a request for retransmission of the message data from the first MT. In response to the request, the first MT retransmits the message data during a next pre-defined time slot (e.g., time slot $A_2$) to the BS. Upon receipt of the retransmitted message data, the BS performs the ARQ error control technique using the retransmitted message data. Notably, if the BS determines that errors do not exist in the retransmitted message data, then the BS will perform either (A) or (B):

(A) send the retransmitted message data to second MT during a particular time slot of the signal (e.g., time slot $A_2$); or (B) combine the retransmitted message data with the temporarily stored message data containing errors, and then communicate the combined message data to the second MT during the particular time slot of the signal (e.g., time slot $A_2$).

As a consequence of the error correction operations, a gap in the voice message is introduced by the BS. The gap in the voice message can be equal to the duration of a time slot (as shown in FIG. 13) or a multiple of the duration of a time slot. This gap degrades voice quality.

SUMMARY OF THE INVENTION

Embodiments of the present invention concern implementing systems and methods for providing Time Division Multiple Access (TDMA) communication in a communication system. The methods involve determining a channel quality of an uplink channel. The channel quality determination can be performed at a physical layer of the communication system. The channel quality determination can be performed in response to the reception of a call set up message.

An integer value "K" is selected based on a value of the channel quality. For example, if the value of the channel quality is less than a threshold value, then "K" is set equal to a first value. If the value of the channel quality is greater than a threshold value, then "K" is set equal to a second value that is smaller than the first value. In either scenario, "K" can be less than or equal to a total number of frames "N" of a time slot of a TDMA signal. Each of the first and second values can be selected from a set of values. Embodiments of the present invention are not limited in this regard.

Thereafter, a value of a communication delay "d" is set equal to the integer value "K". The value of the communication delay "d" sets a number of frames of delay of message communication over a downlink channel. The communication delay "d" is employed by the present invention for purposes of ensuring that a gap is not introduced into a message by a network node during the performance of an error control process.

The methods also involve receiving first message data at a network node (e.g., a base station). The first message data is communicated over the uplink channel in a first time slot of an uplink signal. The first message data includes a plurality of segments of a data message (e.g., a voice or audio message). An error control process is performed at the network node using the first message data. The error control process can include, but is not limited to, an ARQ error control process. The ARQ error control process identifies segments of the first message data that contain errors. Thereafter, one or more segments that have been identified as containing errors are selected for retransmission over the uplink channel. The segment(s) is(are) selected based on at least one parameter. The parameter determines how many of the segments are selected. The parameter is selected from the group consisting of a bandwidth of an uplink and/or downlink signal, the communication delay "d", the number of frames in a time slot of the downlink signal and the channel quality.

As a result of the error control process, first error free message data is identified. When "K"<"N", at least a portion of the first error free message data and/or first filler data is communicated from the network node over a downlink channel in a last "N−K" frames of a first time slot of a downlink signal. In this scenario, a first "K" frames of the first time slot of the downlink signal are unused. When "K"="N", the first error free message data and/or first filler data are communicated from the network node over a downlink channel in a second time slot of the downlink signal.

The methods further involve receiving, at the network node, second message data communicated over the uplink channel in a second time slot of the uplink signal. The error control process is performed a second time using the second message data to at least identify second error free message data. Error free message data and/or second filler data is then communicated from the network node over the downlink channel in a second time slot of the downlink signal. The error free message data includes a second portion of the first error free message data and/or a first portion of the second error free message data.

Thereafter, third message data is communicated to the network node over the uplink channel in a third time slot of the uplink channel. The error control process is performed a third time using the third message data to at least identify third error free message data. Subsequent to completing the error control process, error free message data and/or third filler data is communicated from the network node over the downlink channel in a third time slot of the downlink signal. The error free message data includes a second portion of the second error free message data and/or a first portion of the third error free message data. Any remaining portion of the third error free message data is then communicated over the downlink channel in a fourth timeslot of the downlink signal. In this scenario, at least one frame of the fourth time slot of the downlink signal may be unused.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
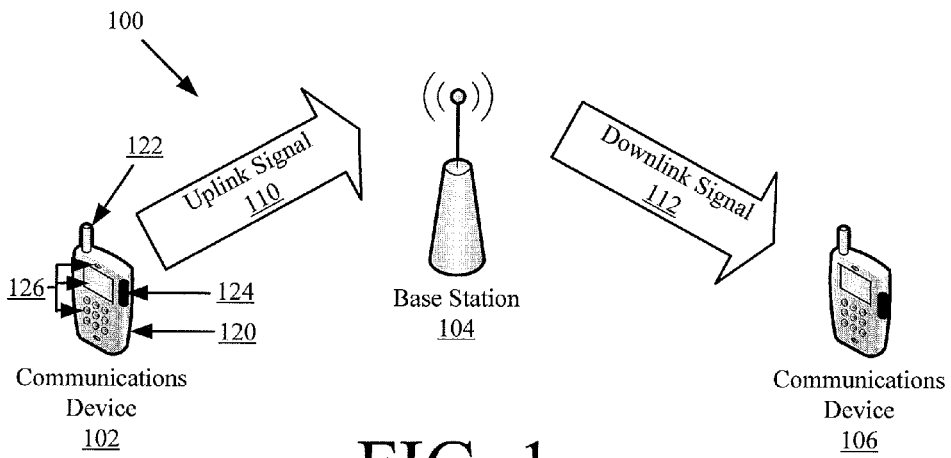
FIG. 1 is a conceptual diagram of a first exemplary communication system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention generally concern implementing systems and methods for providing TDMA voice communication. Notably, the systems and methods of the present invention are configured to overcome certain drawbacks of conventional implementing systems and methods for providing TDMA voice communication. For example, the present invention can reduce gaps that may occur in speech communications during a TDMA voice communication process as compared to that of a conventional base station.

Method embodiments of the present invention generally involve determining a channel quality of an uplink channel. The channel quality determination can be performed at a physical layer of the communication system. The channel quality determination can be performed in response to the reception of a call set up message.

After the channel quality is determined, an integer value "K" is selected based on a value of the channel quality. For example, if the value of the channel quality is less than a threshold value, then "K" is set equal to a first value. If the value of the channel quality is greater than a threshold value, then "K" is set equal to a second value that is smaller than the first value. In either scenario, "K" can be less than or equal to a total number of frames "N" of a time slot of a TDMA signal. Each of the first and second values can be selected from a set of values. Embodiments of the present invention are not limited in this regard.

After the integer value "K" is selected, a value of a communication delay "d" is set equal to the integer value "K". The value of the communication delay "d" sets a number of frames of delay of message communication over a downlink channel. The communication delay "d" is employed by the present invention for purposes of ensuring that a gap is not introduced into a message by a network node during the performance of an error control process.

The methods also involve receiving first message data at a network node (e.g., a base station). The first message data is communicated over the uplink channel in a first time slot of an uplink signal. The first message data includes a plurality of segments of a data message (e.g., a voice or audio message). An error control process is performed at the network node using the first message data. The error control process can include, but is not limited to, an ARQ error control process. The ARQ error control process identifies segments of the first message data that contain errors. Thereafter, one or more segments that have been identified as containing errors are selected for retransmission over the uplink channel. The segment(s) is(are) selected based on at least one parameter. The parameter determines how many of the segments are selected. The parameter is selected from the group consisting of a bandwidth of an uplink and/or downlink signal, the communication delay "d", the number of frames in a time slot of the downlink signal and the channel quality.

As a result of the error control process, first error free message data is identified. When "K"<"N", at least a portion of the first error free message data and/or first filler data is communicated from the network node over a downlink channel in a last "N–K" frames of a first time slot of a downlink signal. In this scenario, a first "K" frames of the first time slot of the downlink signal are unused. When "K"="N", the first error free message data and/or first filler data are communicated from the network node over a downlink channel in a second time slot of the downlink signal.

Notably, the present invention overcomes various drawbacks of conventional implementing systems and methods for providing TDMA voice communications. For example, the present invention minimizes or eliminates gaps that may occur in speech communications when a base station determines that errors exist in payload data received from a calling communication device (e.g., a radio or mobile phone). The gap minimization/elimination features of the present invention will become more evident as the discussion progresses.

The present invention will be described below in relation to voice communications. However, the present invention is not limited in this regard. For example, the present invention is applicable in any situation where there is a need for a TDMA communication method, an eXtended TDMA (XTDMA) communication method and/or an improved error control method for data transmission.

Exemplary Communication System Implementing the Present Invention

Referring now to FIG. 1, there is provided a conceptual diagram of a communication system 100 that implements one or more method embodiments of the present invention. The communication system 100 can include a Land Mobile Radio (LMR) based system or a cellular based system. If the communication system 100 is a cellular based system, then it can include a second generation (2G) compatible system, a third generation (3G) compatible system and/or a fourth generation (4G) compatible system. The phrase "second generation (2G)", as used herein, refers to second-generation wireless telephone technology. The phrase "third generation (3G)", as used herein, refers to third-generation wireless telephone technology. The phrase "fourth generation (4G)", as used herein, refers to fourth-generation wireless telephone technology. In this scenario, the communication system 100 can support various 2G data services (e.g., text messaging), 3G data services (e.g., video calls) and/or 4G data services (e.g., ultra-broadband internet access). Embodiments of the present invention are not limited in this regard.

The communication system 100 can also employ a single communication protocol or multiple communication protocols. For example, if the communication system 100 is a Land Mobile Radio (LMR) based system, then it can employ one or more of the following communication protocols: a Terrestrial Trunked Radio (TETRA) transport protocol; a P25 transport protocol; an OPENSKY® protocol; an Enhanced Digital Access Communication System (EDACS) protocol; a MPT1327 transport protocol; a Digital Mobile Radio (DMR) transport protocol; and a Digital Private Mobile Radio (DPMR) transport protocol. If the communication system 100 is a cellular network, then it can employ one or more of the following communication protocols: a Wideband Code Division Multiple Access (WCDMA) based protocol; a Code Division Multiple Access (CDMA) based protocol; a Wireless Local Area Network (WLAN) based protocol; an Enhanced Data rates for GSM Evolution (EDGE) network based protocol; and a Long Term Evolution (LTE) network based protocol. Embodiments of the present invention are not limited in this regard.

As shown in FIG. 1, the communication system 100 comprises communication devices 102, 106 and a network node 104. Although the network node 104 is shown to be a base station, embodiments of the present invention are not limited in this regard. For example, the network node 104 can include any network device configured to enable communications between the communication devices 102, 106. Such network devices include, but are not limited to, access points to a network and servers.

Each of the communication devices 102, 106 includes, but is not limited to, a radio, a mobile phone, a cellular phone, a personal digital assistant or a personal computer. In each of these scenarios, the communication device 102, 106 includes a housing 120, an antenna 122 and internal circuitry (not shown in FIG. 1). The internal circuitry (not shown in FIG. 1) can include, but is not limited to, a processor and a memory having instructions stored therein. When the instructions are executed, the processor is caused to perform operations in accordance with a particular data communication application. Such operations can include, but are not limited to, message generation operations, packet generation operations, TDMA communication operations and/or XTDMA communication operations. The communication device 102, 106 also includes a control element (e.g., a push-to-talk button or switch) 124 and other user interface components 126.

Although the communication devices 102, 106 are shown to be handheld mobile communication devices, embodiments of the present invention are not limited in this regard. For example, each of the communication devices 102, 106 can alternatively be a stationary console, a dispatch center or a mobile center (e.g., a vehicle or a supervisor on foot). If one of the communication devices 102, 106 is a dispatch center, then it can include, but is not limited to, an emergency communication center, an agency communication center, an inter-agency communication center and any other communication center which provides dispatching and logistical support for personnel management.

Figure 2:
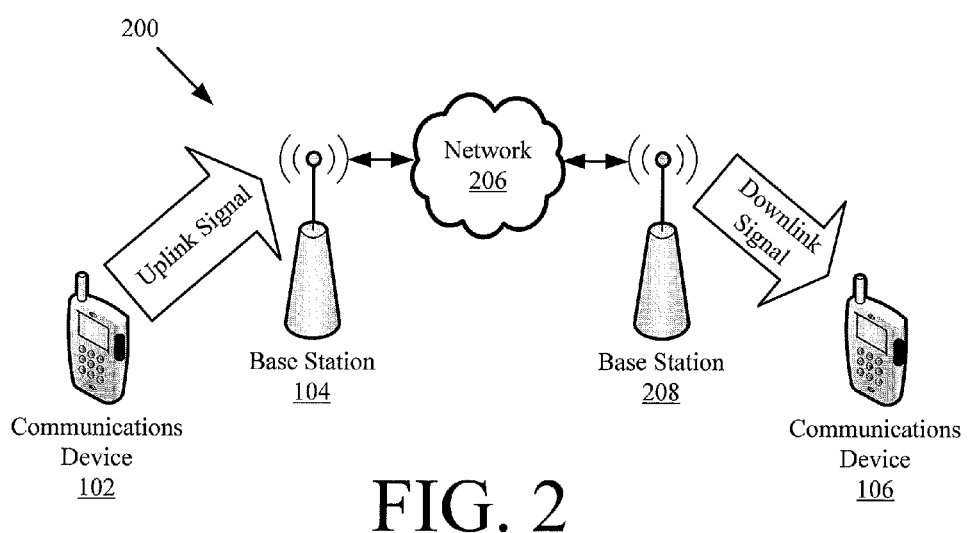
FIG. 2 is a conceptual diagram of a second exemplary communication system that is useful for understanding the present invention.

The communication system 100 may include more or less components than those shown in FIG. 1. For example, the communication device may include two (2) base stations (e.g., base stations 104 and 208 of FIG. 2) communicatively coupled to each other via a network (e.g., network 206 of FIG. 2) as shown in FIG. 2. In this scenario, the base stations can act as access points that allow disparate communication networks or disparate cellular networks to connect via an intermediary connection (e.g., an internet protocol connection or a packet-switched connection). Embodiments of the present invention are not limited in this regard.

Still, the components shown in FIG. 1 are sufficient to disclose an illustrative embodiment implementing the present invention. The hardware architecture of FIG. 1 represents one embodiment of a representative communication system configured to provide a high data reliability call service to service users. The high data reliability feature of the call service is achieved by the implementation of a novel TDMA communication technique described in detail below. The novel TDMA communication technique advantageously employs an improved error control method. The improved error control method will also be described in detail below. However, it should be understood that the error control method generally involves error detection and error correction that enable reliable delivery of data over an unreliable communication channel. The communication channel may be considered unreliable because it is subject to noise, fading, multipath, weak signals and so on. In this scenario, errors may be introduced into message data during transmission from the calling communication device 102 to the base station 104. The error detection allows detecting such errors, while the error correction enables correction of such errors.

The call service can include an individual call service by which a service user is able to talk to other service users. The call service can also include a group call service by which a service user is able to simultaneously talk to other service users associated with a particular talk group or social media profile. The group call service can be implemented by a Push-To-Talk (PTT) group call service. The PTT group call service is an instant service by which the PTT service user is able to immediately talk to other PTT service users of a particular talk group or social media profile by pushing a key or button of a communication device (e.g., communication devices 102, 106). Notably, in a group call mode, the communication devices (e.g., communication devices 102, 106) are operating as half duplex devices, i.e., each communication device can only receive a group call communication or transmit a group call communication at any given time. As such, two or more members of a particular talk group or social media profile can not simultaneously transmit group call communications to other members of the talk group or social media profile.

The base station 104 allows for communications between the communication devices 102, 106. As such, each of the communication devices 102, 106 can connect to the base station 104 via a wired or wireless communication link. Notably, the base station 104 implements a novel method for providing TDMA voice communication. The base station 104 will be described in detail below in relation to FIG. 3. The novel TDMA voice communication method will be described in detail below in relation to FIGS. 4-14. The novel TDMA communication technique advantageously employs an improved ARQ error control method. The improved ARQ error control method will be described in detail below in relation to FIGS. 7-8.

Figure 3:
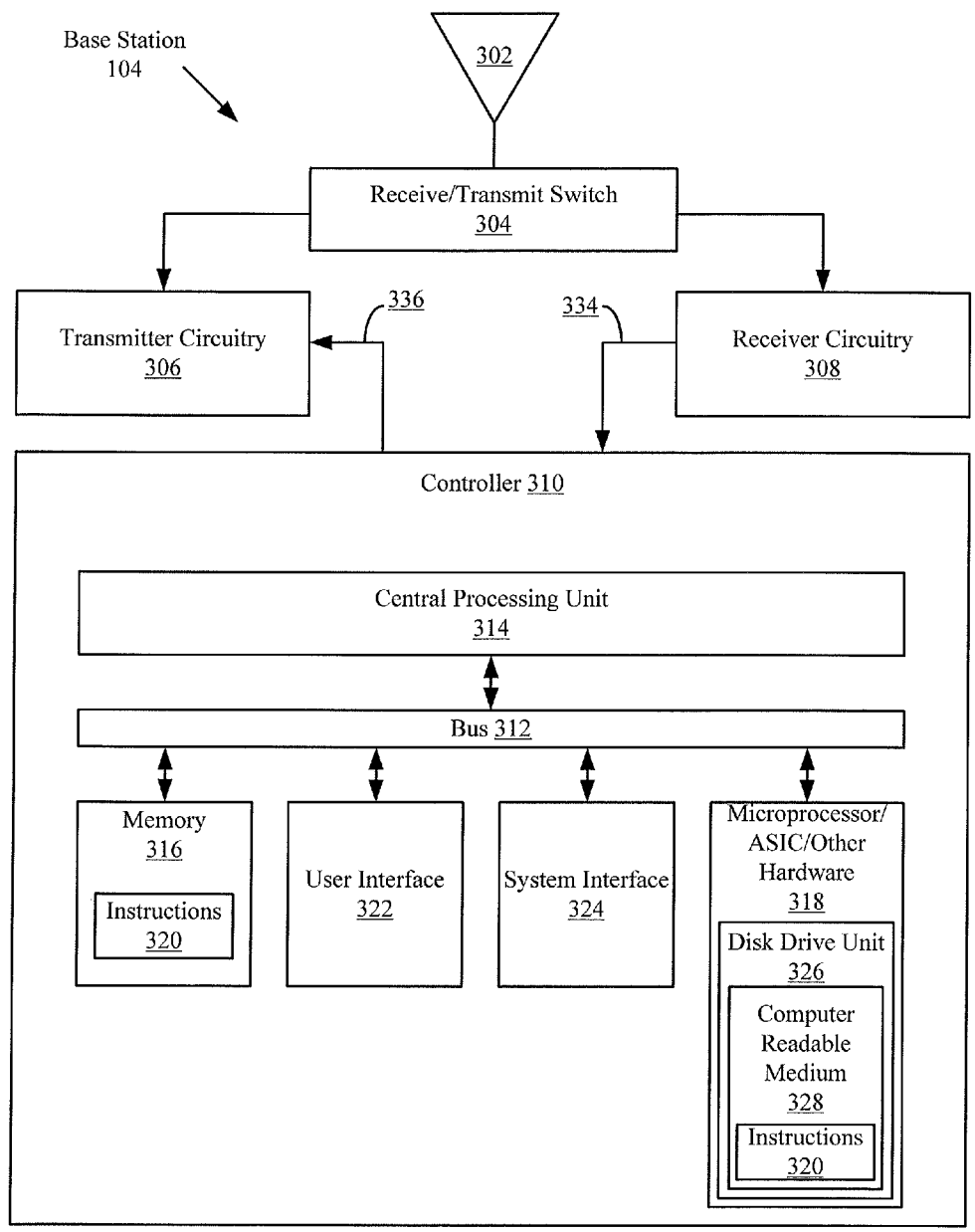
FIG. 3 is a detailed block diagram of a base station shown in FIG. 1 that is useful for understanding the present invention.

Referring now to FIG. 3, there is provided a detailed block diagram of the base station 104 of FIG. 1. Notably, the base station 104 may include more or less components than those shown in FIG. 3. However, the components shown are sufficient to disclose an illustrative embodiment implementing the present invention. The hardware architecture of FIG. 3 represents one embodiment of a representative base station configured to facilitate the provision of a high data reliability call service to a user thereof. As such, the base station 104 of FIG. 3 implements an improved method for providing TDMA voice communication in accordance with embodiments of the present invention. Exemplary embodiments of the improved method will be described below in relation to FIGS. 4-14.

As shown in FIG. 3, the base station 104 comprises an antenna 302 for receiving and transmitting Radio Frequency (RF) signals. A receive/transmit (Rx/Tx) switch 304 selectively couples the antenna 302 to the transmitter circuitry 306 and receiver circuitry 308 in a manner familiar to those skilled in the art. The receiver circuitry 308 decodes the RF signals received from a communication device (e.g., the communication device 102 or 106 of FIG. 1) to derive information therefrom. The receiver circuitry 308 is coupled to a controller 310 via an electrical connection 334. The receiver circuitry 308 provides decoded RF signal information to the controller 310. The controller 310 uses the decoded RF signal information in accordance with the function(s) of the base station 104.

The controller 310 also provides information to the transmitter circuitry 306 for encoding information and/or modulating information into RF signals. Accordingly, the controller 310 is coupled to the transmitter circuitry 306 via an electrical connection 336. The transmitter circuitry 306 communicates the RF signals to the antenna 302 for transmission to an external device (e.g., communication device 106 of FIG. 1).

As shown in FIG. 3, the controller 310 comprises a system interface 324, a user interface 322, a Central Processing Unit (CPU) 314, a system bus 312, a memory 316 connected to and accessible by other portions of the controller 310 through system bus 312, and hardware entities 318 connected to system bus 312. System interface 324 allows the base station 106 to communicate directly with external communication devices (e.g., communication device 102, 104 of FIG. 1, network equipment and other base stations) via a wired communications link. At least some of the hardware entities 318 perform actions involving access to and use of memory 316, which may be a random access memory (RAM), a disk drive, and/or a compact disc read only memory (CD-ROM).

Hardware entities 318 may include microprocessors, application specific integrated circuits (ASICs) and other hardware. Hardware entities 318 may include a microprocessor programmed for facilitating the provision of data communication services and/or voice over data communication services to service subscribers. In this regard, it should be understood that the microprocessor can access and run data communication applications and/or voice over data communication applications installed on the base station 106. At least one of the communication applications is operative to perform TDMA and/or XTDMA communication operations involving error control processes. The TDMA and/or XTDMA communication operations can include, but are not limited to, signal receiving operations, signal processing operations, signal generation operations, and signal communication operations.

The signal processing operations include, but are not limited to, channel quality determination operations, communication delay operations and error control operations. The communication delay operations include, but are not limited to, setting the duration of a communication delay to a particular value based on the channel quality.

The error control operations include, but are not limited to, decoding message data, determining if errors exist in the decoded message data, forwarding error free message data to an external device (e.g., communication device 106 of FIG. 1) and sending a message to an external device (e.g., communication device 102 of FIG. 1) indicating that the message data is error free. In a Hybrid ARQ Type I error control scenario, the error control operations can also involve discarding message data determined to contain errors, and sending a request for retransmission of the message data to an external device (e.g., the communication device 102 of FIG. 1). An exemplary Hybrid ARQ Type I error control method will be described below in relation to FIG. 7. In a Hybrid ARQ Type II error control scenario, the error control operations can also involve temporarily storing message data determined to contain errors, sending a request for retransmission of the message data to an external device (e.g., the communication device 102 of FIG. 1), and combining the temporarily stored message data with retransmitted message data. An exemplary Hybrid ARQ Type II error control method will be described below in relation to FIG. 8.

As shown in FIG. 3, the hardware entities 318 can include a disk drive unit 326 comprising a computer-readable storage medium 328 on which is stored one or more sets of instructions 320 (e.g., software code) configured to implement one or more of the methodologies, procedures, or functions described herein. The instructions 320 can also reside, completely or at least partially, within the memory 316 and/or within the CPU 314 during execution thereof by the base station 104. The memory 316 and the CPU 314 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the base station 104 and that cause the base station 104 to perform any one or more of the methodologies of the present disclosure.

As evident from the above discussion, the communication system 100 implements one or more method embodiments of the present invention. The method embodiments of the present invention reduces or eliminates the gap that may occur in communications (e.g., speech communication) as a result of the performance of conventional TDMA or XTDMA communication processes and conventional error control techniques at a base station. Exemplary method embodiments of the present invention will now be described in relation to FIGS. 3-14.

Exemplary Method Embodiments of the Present Invention

Figure 5:
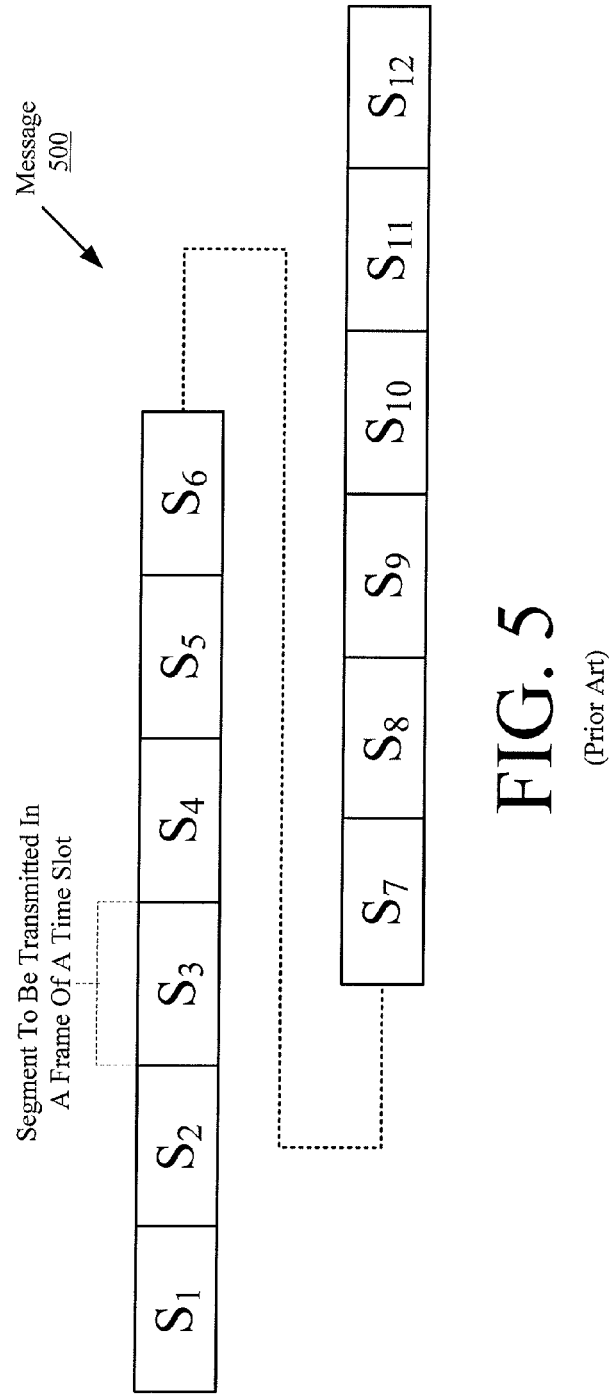
FIG. 5 is a conceptual diagram of an exemplary message that is useful for understanding the present invention.
Figure 6:
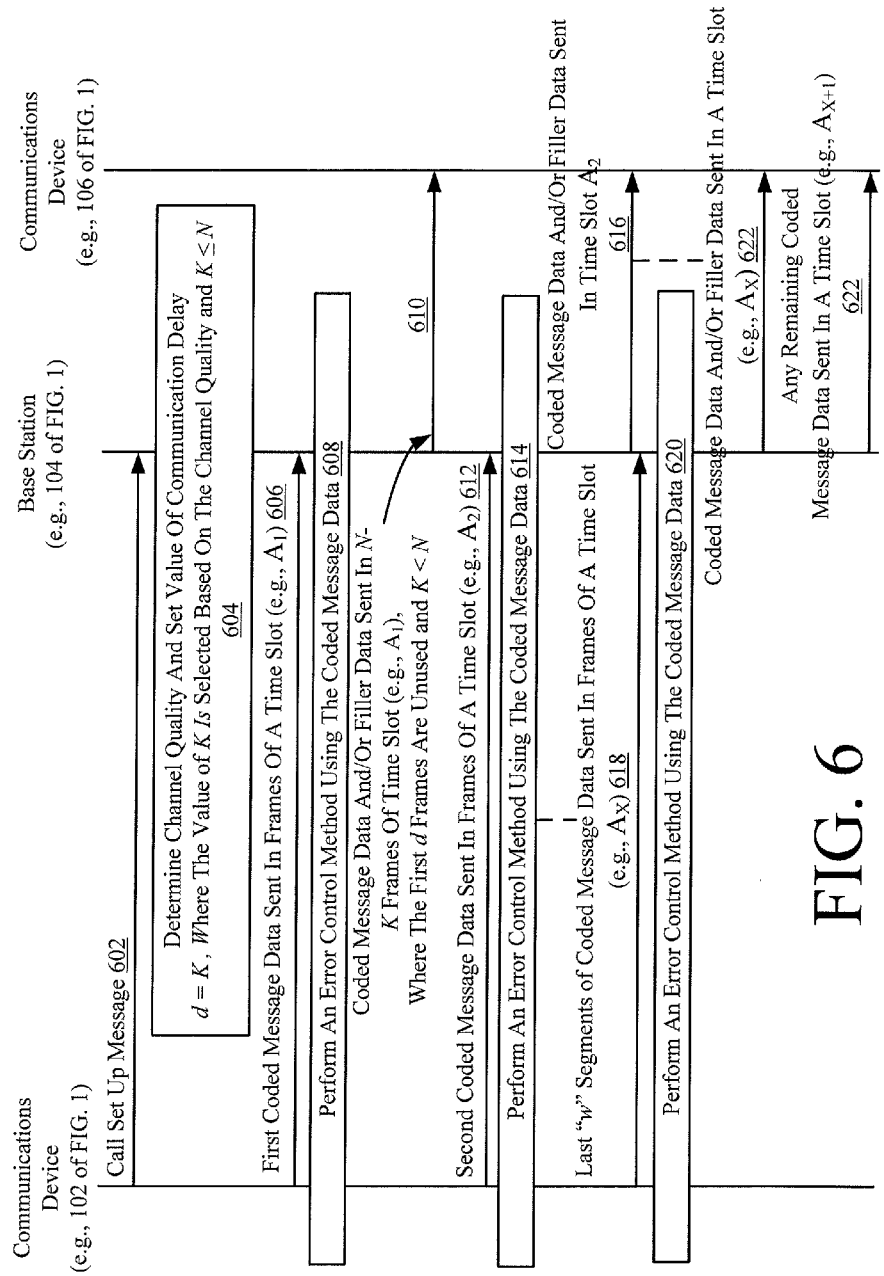
FIG. 6 is a signaling diagram of an exemplary TDMA communication in the communication system of FIG. 1 that is useful for understanding the present invention.
Figure 7:
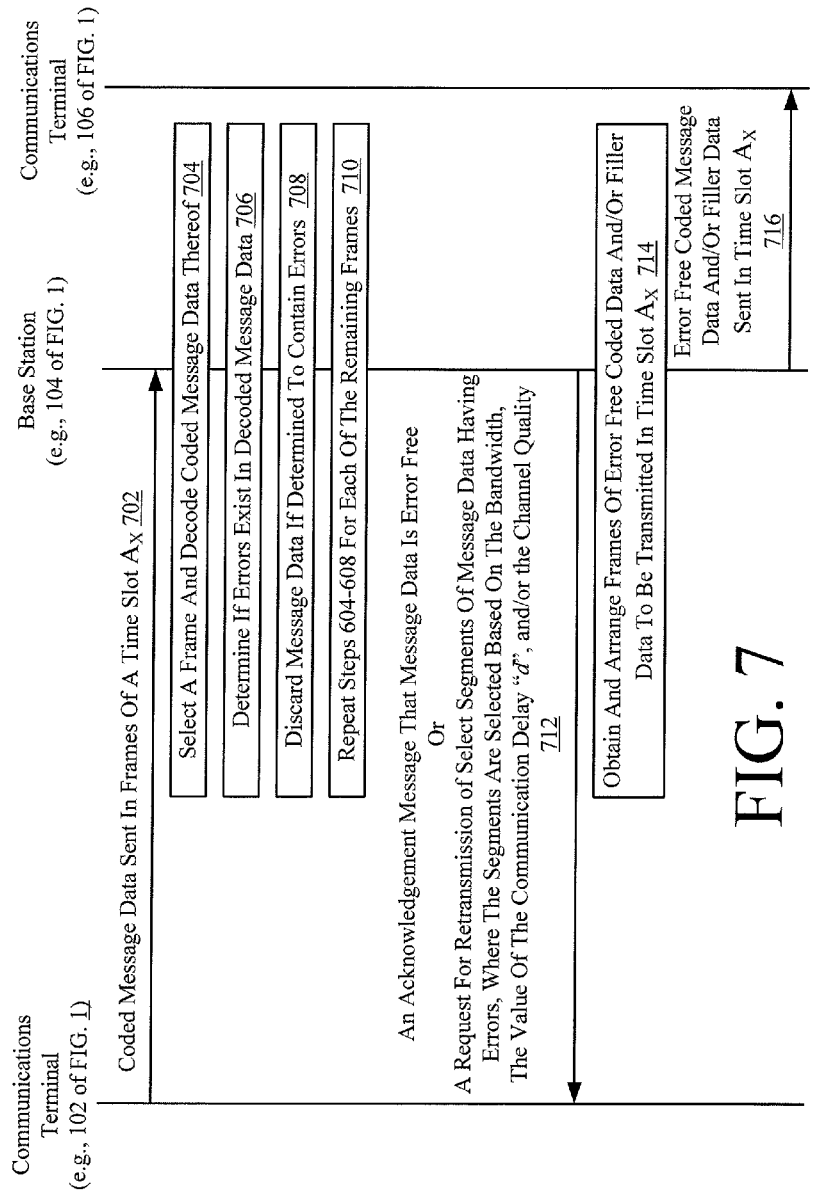
FIG. 7 is a signaling diagram of an exemplary Hybrid ARQ Type I error control process performed in the communication system of the present invention that is useful for understanding the present invention.
Figure 8:
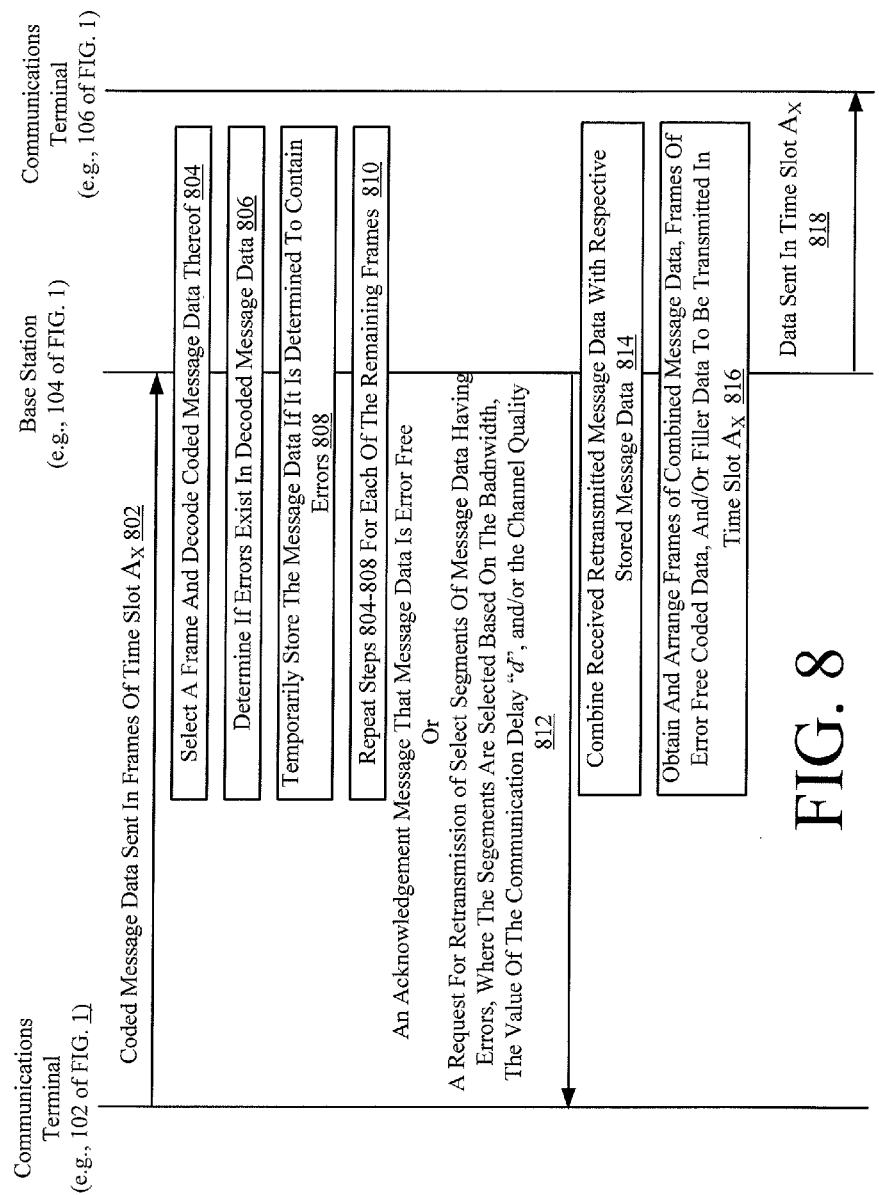
FIG. 8 is a signaling diagram of an exemplary Hybrid ARQ Type II error control process performed in the communication system of the present invention that is useful for understanding the present invention.

FIG. 6 shows an exemplary method for providing reliable data communications using a communication system (e.g., the communication system 100) that is useful for understanding the present invention. More particularly, FIG. 6 shows an exemplary method in which a base station (e.g., base station 104 of FIG. 1) performs a modified TDMA communication process. The TDMA communication process involves the performance of a modified error control technique. Exemplary embodiments of the modified error control technique are shown in FIGS. 7-8. Prior to discussing FIGS. 6-8, an explanation of an exemplary TDMA signal and an exemplary message is provided that is useful for understanding the signaling processes of FIGS. 6-8. The exemplary TDMA signal will be described below in relation to FIG. 4. The exemplary message is provided below in relation to FIG. 5.

Figure 4:
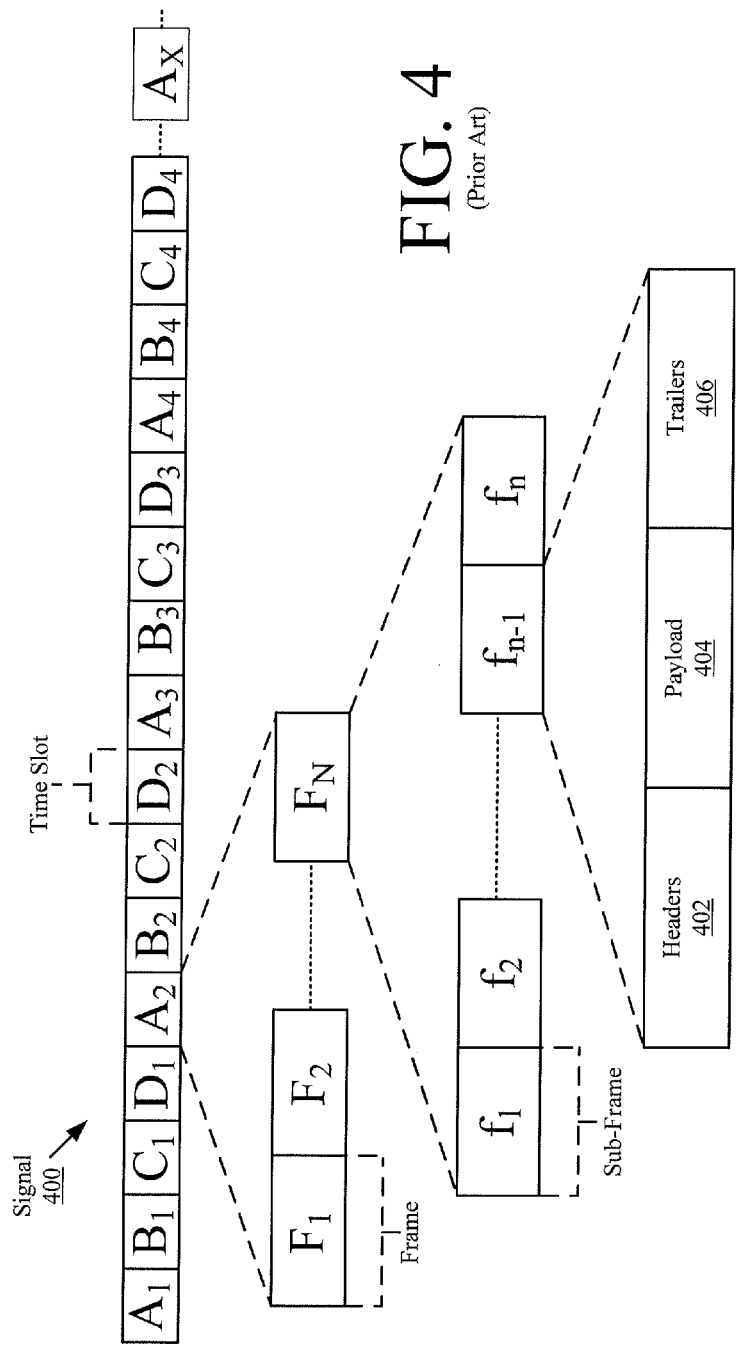
FIG. 4 is a conceptual diagram of an exemplary communication signal that is useful for understanding the present invention.

Referring now to FIG. 4, the TDMA signal 400 is divided into a plurality of different time slots $A_1, A_2, A_3, A_4, \ldots, A_X$, $B_1, B_2, B_3, B_4, \ldots, B_X$ (not shown in FIG. 4), $C_1, C_2, C_3, C_4, \ldots, C_X$ (not shown in FIG. 4) and $D_1, D_2, D_3, D_4, \ldots, D_X$ (not shown in FIG. 4). The time slot format of the TDMA signal 400 allows several users to share the same frequency channel. In this regard, each set of time slots is associated with a particular user. For example, time slots $A_1, A_2, A_3, A_4, \ldots, A_X$ are associated with a first user (e.g., user of communication device 102 of FIG. 1). The time slots $B_1, B_2, B_3, B_4, \ldots, B_X$ (not shown in FIG. 4) are associated with a second user (e.g., user of communication device 106 of FIG. 1). The time slots $C_1, C_2, C_3, C_4, \ldots, C_X$ (not shown in FIG. 4) are associated with a third user. The time slots $D_1, D_2, D_3, D_4, \ldots, D_X$ (not shown in FIG. 4) are associated with a fourth user. The users transmit in rapid succession, one after the other, each using his or her own time slot. This allows multiple communication devices (e.g., communication devices 102, 106 of FIG. 1) to share the same transmission medium (e.g., a radio frequency channel) while using only a part of its channel capacity.

Each time slot includes a plurality of data frames $F_1, F_2, \ldots, F_N$. Each data frame $F_1, F_2, \ldots, F_N$ includes a plurality of sub-frames $f_1, f_2, \ldots, f_n$. Each sub-frame includes a packet containing payload information 404 encapsulated between header information 402 and trailer information 406. The payload information 404 can include, but is not limited to, data to be transmitted (e.g., message data). The header and/or trailer information may contain configuration parameters as well as variables used to process and control handling of the packet.

Referring now to FIG. 5, there is provided a conceptual diagram of a message 500 that is useful for understanding the present invention. The message 500 is to be communicated from a communication device (e.g., communication device 102 of FIG. 1) in a TDMA signal (e.g., TDMA signal 400). As shown in FIG. 5, the message 500 includes a plurality of segments $S_1, S_2, \ldots, S_{12}$. Although the message 500 is shown in FIG. 5 to include twelve (12) segments, the present invention is not limited in this regard. The message 500 can include any number of segments selected in accordance with a particular communication application.

Each segment $S_1, S_2, \ldots, S_{12}$ includes a portion of the message data. Each segment $S_1, S_2, \ldots, S_{12}$ is to be communicated in a respective data frame (e.g., frame $F_1, F_2, F_3$ or $F_4$) of a respective time slot (e.g., time slot $A_1, A_2, A_3$ or $A_4$) of a TDMA signal (e.g., TDMA signal 400). In this regard, it should be understood that the segments $S_1, S_2, \ldots, S_{12}$ are communicated in sequential order, except when a particular segment needs to be retransmitted in the TDMA signal. For example, segments $S_1, S_2, S_3$ and $S_4$ are communicated from a calling communication device (e.g., communication device 102 of FIG. 1) to a base station (e.g., base station 104 of FIG. 1) in frames $F_1, F_2, F_3, F_4$ of a time slot $A_1$ of a TDMA signal (e.g., signal 400 of FIG. 4), respectively. Segments $S_5, S_6, S_7$ and $S_8$ are communicated in frames $F_1, F_2, F_3, F_4$ of a time slot $A_2$ of the TDMA signal, respectively. Errors are introduced into segment $S_6$ during communication thereof. As such, segment $S_6$ may be retransmitted from the calling communication device. In this scenario, segments $S_6, S_9, S_{10}$ and $S_{11}$ are communicated in frames $F_1, F_2, F_3, F_4$ of a time slot $A_3$ of the TDMA signal, respectively. Thereafter, segment $S_{12}$ is communicated in frame $F_1$ of a time slot $A_4$ of the TDMA signal. Embodiments of the present invention are not limited in this regard.

Referring now to FIG. 6, there is provided a signaling diagram of a TDMA communication of a communication system (e.g., the communication system 100 of FIG. 1) that is useful for understanding the present invention. Exemplary communication systems are described above in relation to FIGS. 1-2. As shown by step 602 of FIG. 6, the TDMA communication begins by communicating a call set up message from a calling communication device (e.g., communication device 102) to a base station (e.g., base station 104 of FIG. 1). At the base station, operations are performed to determine a channel quality of the uplink channel. The channel quality determination can be performed in response to the reception of the call set up message.

There are various methods known in the art for determining channel quality. Any of these known methods and/or combinations thereof can be used with the present invention without limitation. For example, the channel quality determination can involve performing physical layer operations to measure a Received Signal Strength (RSS), a Co-Channel Interference (CCI) and a Carrier-to-Noise Ratio (CNR or C/N). RSS is the strength of a signal or power level being received by an antenna. CCI is crosstalk from two (2) different radio transmitters using the same frequency. CNR is the Signal-to-Noise Ratio (SNR) of a modulated signal. RSS, CCI and CNR are well known in the art, and therefore will not be described in more detail herein. Embodiments of the present invention are not limited in this regard.

It should be emphasized that channel quality measurements are typically performed in conventional communication systems at an application layer. In contrast, the channel quality measurements of the present invention are performed at the physical layer. By performing the channel quality measurements at the physical layer instead of the application layer, the overall processing time needed for determining a channel quality in the base station is advantageously reduced. Still, the invention is not limited in this regard and channel quality can also be measured at the application layer.

After the channel quality is determined by the base station, a value of a communication delay "d" is set as shown by step 604. The value of the communication delay "d" is set so that the performance of an ARQ error control method does not introduce a gap in a communication (e.g., a speech communication), or reduces the gap in the communication (e.g., speech communication) as compared to that of conventional communication systems. In this regard, it should be understood that the value of the communication delay "d" sets a number of frames of delay of message communication over a downlink channel.

The value of the communication delay "d" is set based on the value of the channel quality. For example, the value of the communication delay "d" is set to a small value (e.g., a value less than or equal to N divided by two) when the value for the channel quality is high. The channel quality can be deemed high when its value is greater than or equal to a threshold value. In contrast, the value of the communication delay "d" is set to a high value (e.g., a value that is greater than or equal to N divided by two) when the value for channel quality is low. The channel quality can be deemed low when its value is less than or equal to a threshold value. The threshold value(s) is(are) selected in accordance with a particular communication application. Also, each of the low and high values can be selected from a set of values. Embodiments of the present invention are not limited in this regard.

The communication delay "d" can be defined by the following mathematical equation (1).

$$d=K, \text{ where } K \leq N \quad (1)$$

where d represents the communication delay. K is a variable having an integer value representing a number of frames in a time slot of a TDMA signal. The value of K is selected based on the value of the channel quality. N represents a total number of frames contained in a time slot of a TDMA signal. As noted above, the present invention is applicable in normal TDMA systems and/or XTDMA systems. In XTDMA systems, the communication delay "d" can have a smaller value than in normal TDMA systems for a given channel quality.

In step 606, first coded message data is sent in one or more frames of a particular time slot (e.g., time slot $A_1$) of a TDMA signal (e.g., TDMA signal 400 of FIG. 4) from the calling communication device to the base station. The first coded message data could be a misrepresentation of the original message data, caused by a number of issues such as multipath, path loss, and interfering transmitters. These errors could cause the frame to appear as comfort noise, speech data representing a low energy voice signal, or any number of scenarios where the deciphered message is not the same as the original message.

In response to receiving the first coded message data, base station performs an ARQ error control method. Exemplary ARQ error control methods will be described below in relation to FIGS. 7-8. However, it should be understood that the ARQ error control method generally involves error detection and error correction that enable reliable delivery of data over an unreliable communication channel. The communication channel may be considered unreliable because it is subject to noise, fading, multipath, weak signals and so on. In this scenario, errors may be introduced into the first message data during transmission from the calling communication device to the base station. The error detection allows detecting such errors, while the error correction enables correction of such errors.

After the ARQ error control process is completed, the base station can communicate coded message data and/or filler data to a called communication device (e.g., communication device 106 of FIG. 1) as shown by step 610. The coded message data of step 610 includes at least a portion of the first coded message data of step 606 that is absent of errors. Notably, step 610 is performed when K is less than N (i.e., K<N). The coded message data and/or filler data is sent in the last N−K frames of a particular time slot (e.g., time slot $A_1$) of a TDMA signal (e.g., TDMA signal 400 of FIG. 4), where the first K frames of the time slot are unused. The coded message data of step 610 can be absent of data representing comfort noise, speech data representing a low energy voice signal and data representing repeating tones. The filler data of step 610 can include, but is not limited to, repeated data, "mute" data representing voicing periods of silence and/or data resulting from a frame interpolation process.

In step 612, second coded message data is sent in a particular time slot (e.g., time slot $A_2$) of a TDMA signal (e.g., TDMA signal 400) from the calling communication device to the base station. In response to receiving the second coded message data, the base station performs another iteration of the ARQ error control method as shown by step 614 using the recently received second coded message data. Upon completion of the ARQ error control method, the base station communicates coded message data and/or filler data to the called communication device as shown by step 616. The coded message data and filler data is communicated in frames of a particular time slot (e.g., time slot $A_2$) of a TDMA signal (e.g., TDMA signal 400 of FIG. 4). The coded message data of step 616 can include a portion of the first coded message data that is absent of errors and/or a portion of the second coded message data that is absent of errors. The coded message data of step 616 can be absent of data representing comfort noise, speech data representing a low energy voice signal and data representing repeating tones. The filler data of step 616 can include, but is not limited to, repeated data, "mute" data representing voicing periods of silence and/or a data resulting from a frame interpolation process.

The above described process of steps 612-616 is repeated until a substantial portion of the message is communicated from the calling communication device to the base station. The phrase "substantial portion", as used here, means that all but the last 'w' segments of coded message data, where 'w' is greater than or equal to one and less than or equal to N (i.e., 1≤w≤N). Thereafter as shown by step 618, the last 'w' segments of coded message data are communicated over an uplink channel from the calling communication device to the base station. The last 'w' segments of coded message data are sent in frames of a particular time slot (e.g., time slot $A_X$) of a TDMA signal (e.g., TDMA signal 400 of FIG. 4).

In response to receiving the last 'w' segments of coded message data, the base station performs yet another iteration of the ARQ error control method as shown by step 620 using the recently received last 'w' segments of coded message data. Upon completion of the ARQ error control method, the base station communicates coded message data and/or filler data to the called communication device as shown by step 622. The coded message data and filler data is communicated in frames of a particular time slot (e.g., time slot $A_X$) of a TDMA signal (e.g., TDMA signal 400 of FIG. 4). The coded message data of step 622 includes at least a portion of the second coded message data that is absent of errors and/or at least a portion of the coded message data received in step 618 that is absent of errors. The coded message data of step 622 can be absent of data representing comfort noise, speech data representing a low energy voice signal and data representing repeating tones. The filler data of step 622 can include, but is not limited to, repeated data, "mute" data representing voicing periods of silence and/or data resulting from a frame interpolation process.

Subsequent to step 622, any remaining coded message data that has not been transmitted from the base station is sent to the called communication device in a particular time slot (e.g., time slot $A_{X+1}$) of a TDMA signal (e.g., TDMA signal 400 of FIG. 4). The time slot can be the next time slot (e.g., time slot $A_{X+1}$) assigned to the user of the calling communication device or an unused time slot, i.e., a time slot that has not been assigned to a user of a communication device.

Referring now to FIG. 7, there is provided a signaling diagram of an exemplary Hybrid ARQ Type I error control process performed in a communication system (e.g., communication system 100 of FIG. 1) that is useful for understanding the present invention. Exemplary communication systems are described above in relation to FIGS. 1-2. Notably, the Hybrid ARQ Type I error control process of FIG. 7 can be performed in one or more of the steps 608, 614 and 620 of FIG. 6.

As shown by step 702 of FIG. 7, the Hybrid ARQ Type I error control method begins by communicating a plurality of frames of coded message data from a calling communication device (e.g., communication device 102 of FIG. 1) to a base station (e.g., base station 104 of FIG. 1).

At the base station, the frames of message data are processed. More particularly, a first frame of the plurality of frames is selected as shown by step 704. The coded message data of the selected frame is then decoded as also shown by step 704. Thereafter, in step 706, a determination is made as to whether errors exist in the decoded message data. If it is determined that errors exist in the decoded message data, then the message data is discarded in step 708. Steps 704-708 are iteratively repeated for each frame of the plurality of frames.

Upon completing steps 704-708 for each frame, the base station generates a message to be communicated to the calling communication device (e.g. communication device 102 of FIG. 1). The message can include an acknowledgement message or a request message. The acknowledgement message can indicate that the coded message data of the plurality of frames is error free. The request message can include a request for retransmission of one or more segments containing message data having errors. The segments identified in the request message are selected based on one or more of the following parameters: an available bandwidth of an uplink and/or downlink signal; the communication delay "d"; a number of frames in a time slot of the downlink signal; and/or the channel quality of the uplink signal. In step 712, the message is communicated from the base station to the calling communication device.

It should be emphasized that in conventional communication systems the segments identified in request messages are selected based only on whether or not errors are contained therein. In contrast, the present invention selects segments for retransmission based on whether or not errors are contained therein, as well as on an available bandwidth of an uplink and/or downlink signal, the communication delay "d", the number of frames in a time slot of the downlink signal and/or the channel quality of an uplink signal. Such a segment selection process of the present invention facilitates that reduction and/or elimination of a gap introduced in a message by a base station during an ARQ error control process. Consequently, the voice quality of the communication system of the present invention is better than that of the conventional communication systems.

Referring again to FIG. 6, the base station obtains and arranges frames of error free coded data and/or filler data to be transmitted in a particular time slot (e.g., time slot $A_X$ of FIG. 4) as shown by step 714. Thereafter, in step 716, the error free coded message data and/or filler data is sent from the base station to the called communication device (e.g., communication device 106 of FIG. 1) in the particular time slot (e.g., time slot $A_X$ of FIG. 4) of the TDMA signal (e.g., TDMA signal 400 of FIG. 4).

Referring now to FIG. 8, there is provided a signaling diagram of an exemplary Hybrid ARQ Type II error control process performed in a communication system (e.g., communication system 100 of FIG. 1) that is useful for understanding the present invention. Exemplary communication systems are described above in relation to FIGS. 1-2. Notably, the error control process of FIG. 8 can be performed in one or more of the steps 608, 614 and 620 of FIG. 6.

As shown by step 802 of FIG. 8, the Hybrid ARQ Type II error control method begins by communicating a plurality of frames of coded message data from a calling communication device (e.g., communication device 102 of FIG. 1) to a base station (e.g., base station 104 of FIG. 1). The frames can be absent of comfort noise frames, voice frames with low energy and repeating tone frames.

At the base station, the frames of message data are processed. More particularly, a first frame of the plurality of frames is selected as shown by step 804. The coded message data of the selected frame is then decoded as also shown by step 804. Thereafter, in step 806, a determination is made as to whether errors exist in the decoded message data. If it is determined that errors exist in the decoded message data, then the message data is temporally stored in step 808. Steps 804-808 are iteratively repeated for each frame of the plurality of frames.

Upon completing steps 804-808 for each frame, the base station generates a message to be communicated to the calling communication device (e.g. communication device 102 of FIG. 1). The message can include an acknowledgement message or a request message. The acknowledgement message can indicate that the coded message data of the plurality of frames is error free. The request message can include a request for retransmission of one or more segments containing message data having errors. The segments identified in the request message are selected based on one or more of the following parameters: an available bandwidth of an uplink and/or downlink signal; the communication delay "d"; the number of frames in a time slot of the downlink channel; and/or the channel quality of an uplink signal. In step 812, the message is communicated from the base station to the calling communication device.

It should be emphasized that in conventional communication systems the segments identified in request messages are selected based on whether or not errors are contained therein. In contrast, the present invention selects segments for retransmission based on whether or not errors are contained therein, as well as on an available bandwidth of an uplink and/or downlink signal, the communication delay "d", the number of frames in a time slot of the downlink signals, and/or the channel quality of an uplink signal. Such a segment selection process of the present invention facilitates that reduction and/or elimination of a gap introduced in a message by a base station during an ARQ error control process. Consequently, the voice quality of the communication system of the present invention is better than that of the conventional communication systems.

Referring again to FIG. 8, the base station combines the received retransmitted message data with respective stored message data as shown by step 814. The data combining can be achieved using a chase combining technique or an incremental redundancy technique. The chase combining and incremental redundancy techniques are well known to those skilled in the art, and therefore will not be described herein.

After completing step 814, step 816 is performed where the base station obtains and arranges frames of combined message data, frames of error free coded message data and/or filler data to be transmitted in a particular time slot (e.g., time slot $A_X$ of FIG. 4) of a TDMA signal (e.g., TDMA signal 400 of FIG. 4). In a subsequent step 818, the frames of data are sent from the base station to the called communication device (e.g., communication device 106 of FIG. 1) in the particular time slot (e.g., time slot $A_X$ of FIG. 4) of the TDMA signal (e.g., TDMA signal 400 of FIG. 4).

EXAMPLES

Some or all of the following examples are provided to illustrate specific embodiments of the present invention, and should not be construed as limiting the scope of the invention.

Example 1

Figure 9:
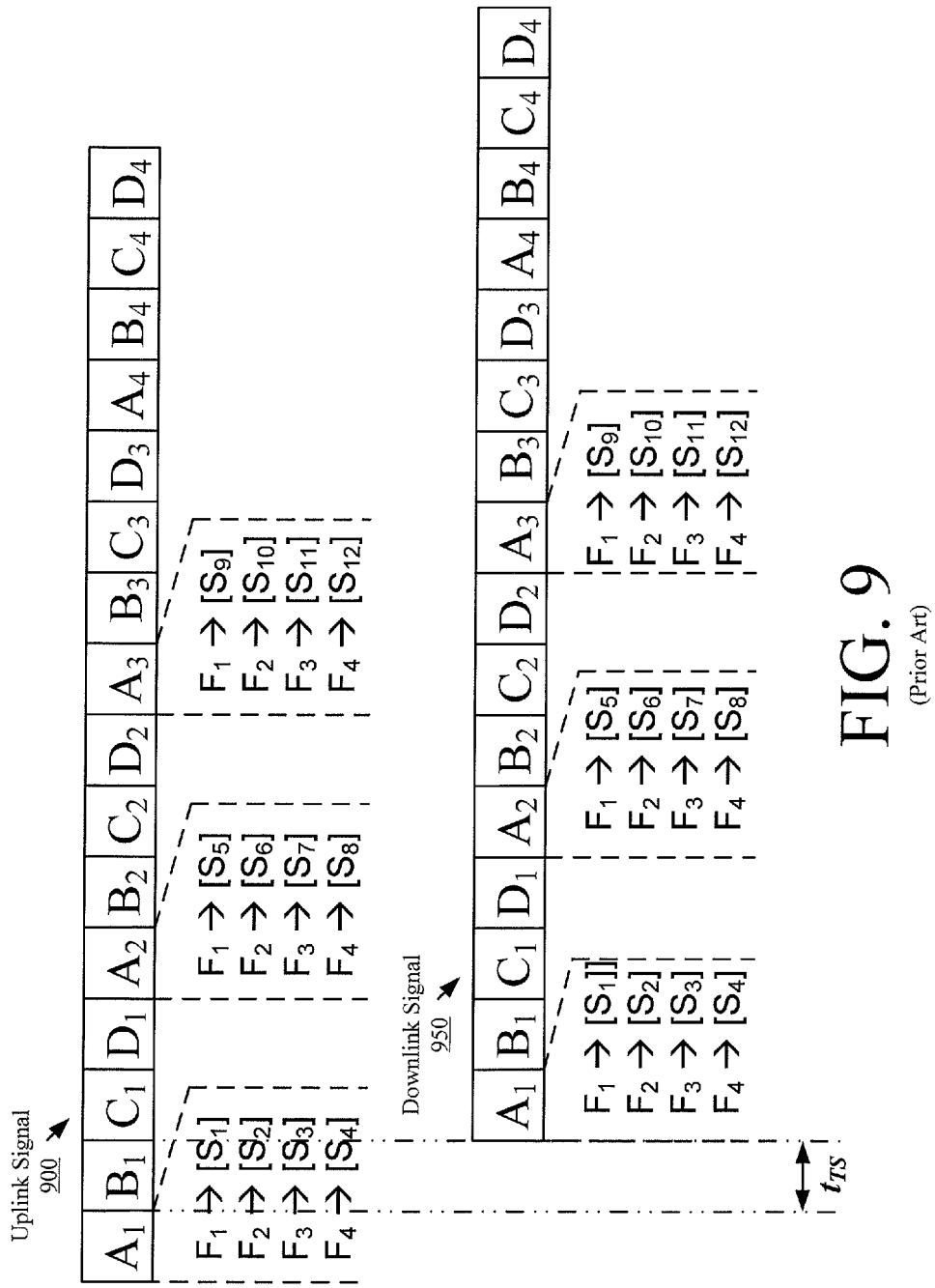
FIG. 9 is a conceptual diagram of exemplary uplink signal and an exemplary downlink signal generated in a conventional communication system, where message data of the uplink signal is error free.

Referring now to FIG. 9, there is provided a schematic illustration of an exemplary uplink signal 900 and an exemplary downlink signal 950 that are generated in a conventional communication system implementing conventional TDMA communication methods. The conventional TDMA communication method employs conventional a Hybrid ARQ Type I error control technique. Notably, the message data of the uplink signal 900 is error free.

FIG. 9 is provided to facilitate a comparison of signals generated during a conventional TDMA communication process to signals generated during the improved TDMA communication method of the present invention, where the message data of the uplink signals is error free. Signals generated during the improved TDMA communication method of the present invention will be described below in relation to FIGS. 10-12.

Referring again to FIG. 9, the uplink signal 900 is a TDMA signal communicated from a calling communication device and received at a conventional base station. The downlink signal 950 is a TDMA signal communicated from the conventional base station to a called communication device. There is an offset $t_{TS}$ between the uplink signal 900 and the downlink signal 950.

As shown in FIG. 9, four (4) users share the uplink and downlink channels in the TDMA scheme. Each user is allocated one (1) time slot every four (4) time slots of the uplink and downlink signals 900, 950. For example, the user of the calling communication device is allocated time slots $A_1$, $A_2$, $A_3$, $A_4$ of the uplink and downlink signals 900, 950. Another user is allocated time slots $B_1$, $B_2$, $B_3$, $B_4$ of the uplink and downlink signals 900, 950, and so on.

Each time slot $A_1, A_2, A_3, A_4, B_1, B_2, B_3, B_4, C_1, C_2, C_3, C_4, D_1, D_2, D_3$ includes four frames $F_1, F_2, F_3, F_4$. Each frame $F_1$, $F_2, F_3$ and $F_4$ can be used to communicate one (1) segment of a message. For example, each time slot $A_1$, $A_2$, $A_3$ of the uplink signal 900 is used to communicate a respective segment $S_1, S_2, \ldots, S_{12}$ of a twelve (12) segment message. The twelve (12) segments $S_1, S_2, \ldots, S_{12}$ of the message are communicated in time slots $A_1$, $A_2$, $A_3$ of the uplink signal 900 in sequential order.

At the conventional base station, the message data is processed to determine if errors exist therein. In the scenario of FIG. 9, the conventional base station determines that no errors exist in the message data. As such, the twelve (12) segments $S_1, S_2, \ldots, S_{12}$ of the message are also communicated in the downlink signal 950 in sequential order.

Example 2

Figure 10:
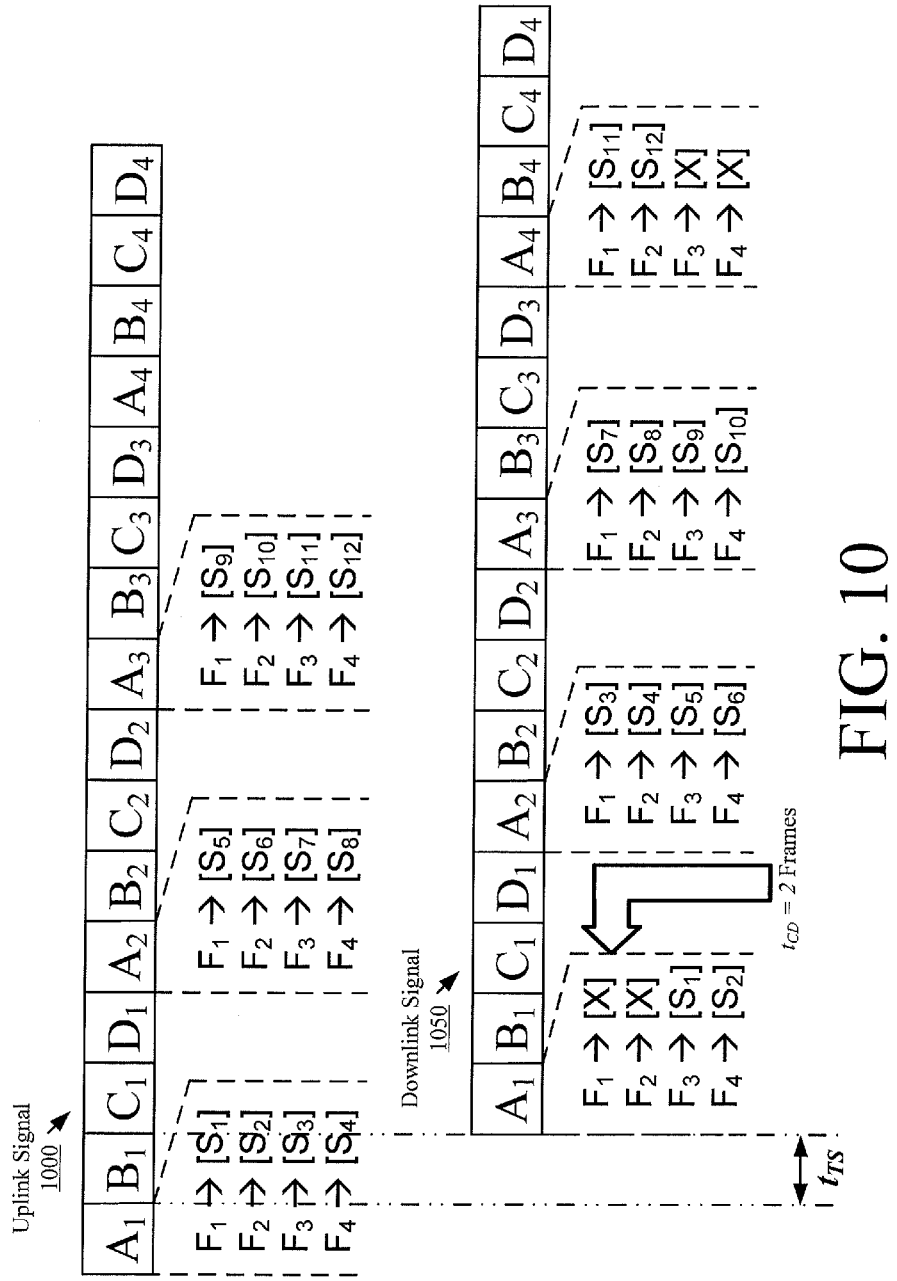
FIGS. 10-12 are conceptual diagrams of exemplary uplink and downlink signals generated in a communication system of the present invention that are useful for understanding scenarios where message data of the uplink signals is error free.

Referring now to FIG. 10, there is provided a schematic illustration of an exemplary uplink signal 1000 and an exemplary downlink signal 1050 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The uplink signal 1000 is a TDMA signal communicated from a calling communication device (e.g., the communication device 102 of FIGS. 1-2) and received at a base station (e.g., the base station 104 of FIGS. 1-2). The downlink signal 1050 is a TDMA signal communicated from the base station to a called communication device (e.g., the communication device 106 of FIGS. 1-2). There is an offset $t_{TS}$ between the uplink signal 1000 and the downlink signal 1050.

As shown in FIG. 10, four (4) users share the uplink and downlink channels in the TDMA scheme. Each user is allocated one (1) time slot every four (4) time slots of the uplink and downlink signals 1000, 1050. For example, the user of the calling communication device is allocated time slots $A_1$, $A_2$, $A_3$, $A_4$ of the uplink and downlink signals 1000, 1050. Another user is allocated time slots $B_1$, $B_2$, $B_3$, $B_4$ of the uplink and downlink signals 1000, 1050, and so on.

Each time slot $A_1, A_2, A_3, A_4, B_1, B_2, B_3, B_4, C_1, C_2, C_3, C_4, D_1, D_2, D_3$ includes four frames $F_1, F_2, F_3, F_4$. Each frame $F_1$, $F_2, F_3$ and $F_4$ can be used to communicate one (1) segment of a message. For example, each time slot $A_1$, $A_2$, $A_3$ of the uplink signal 1000 is used to communicate a respective segment $S_1, S_2, \ldots, S_{12}$ of a twelve (12) segment message. The twelve (12) segments $S_1, S_2, \ldots, S_{12}$ of the message are communicated in time slots $A_1$, $A_2$, $A_3$ of the uplink signal 1000 in sequential order.

At the base station, the message data is processed to determine if errors exist therein. In the scenario of FIG. 10, the base station determined that no errors exist in the message data. As such, the twelve (12) segments $S_1, S_2, \ldots, S_{12}$ of the message are communicated in the downlink signal 1050 in sequential order. However, the downlink signal 1050 has a two (2) frame communication delay $t_{CD}$. Consequently, the first two (2) frames of time slot $A_1$ of the downlink signal 1050 are unused. Accordingly, the message data is communicated in frames $F_3$ and $F_4$ of time slot $A_1$, frames $F_1, F_2, F_3$ and $F_4$ of time slots $A_2$ and $A_3$, and frames $F_1$ and $F_2$ of time slots $A_4$ of the downlink signal 1050. Notably, an additional time slot $A_4$ is used in the downlink signal 1050. The last two (2) frames of the time slot $A_4$ are unused.

Example 3

Figure 11:
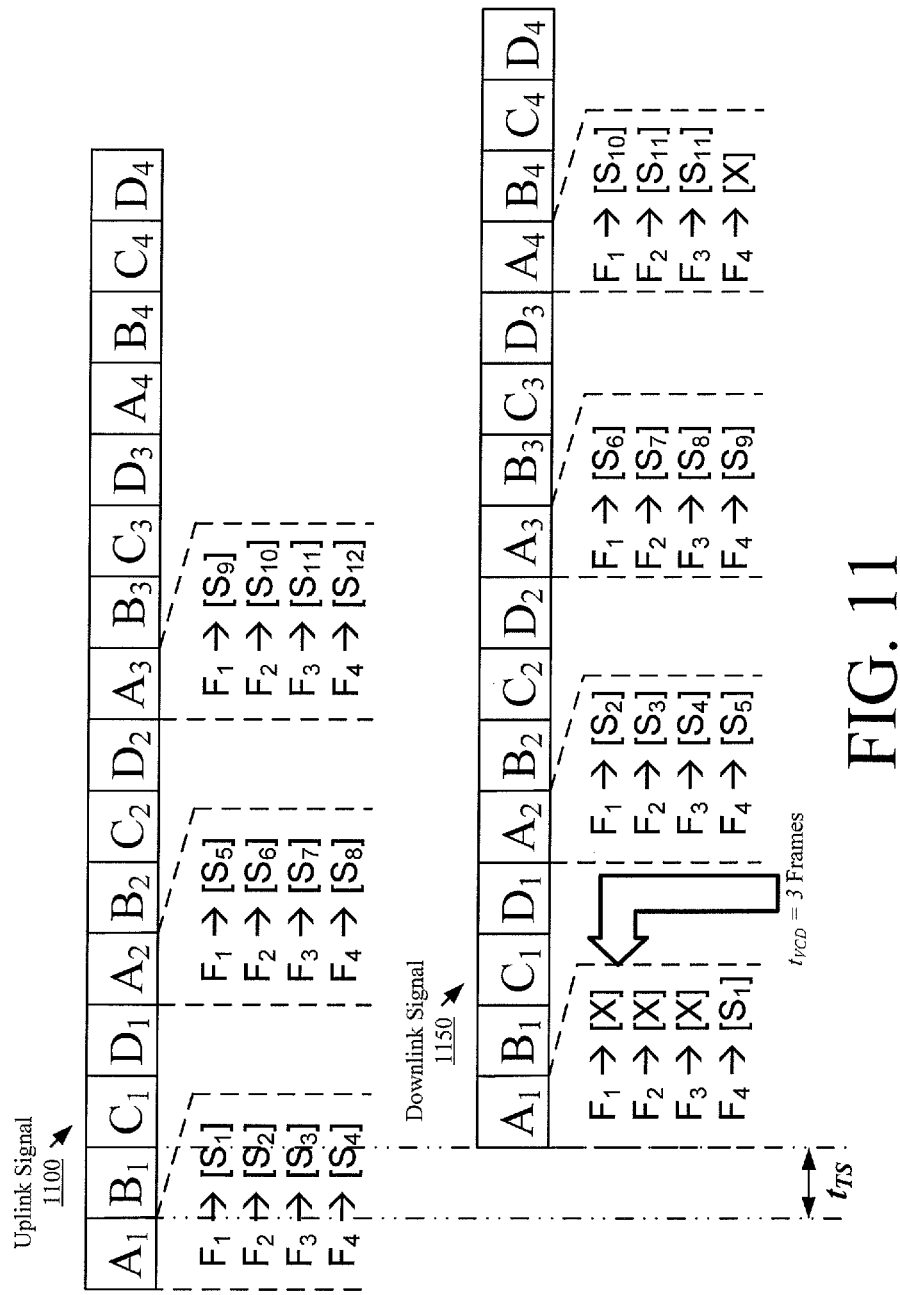

Referring now to FIG. 11, there is provided a schematic illustration of an exemplary uplink signal 1100 and an exemplary downlink signal 1150 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The scenario of FIG. 11 is similar to the scenario of FIG. 10. However, the communication delay $t_{CD}$ of FIG. 11 is set to the duration of three (3) frames, rather than the duration of two (2) frames as shown in FIG. 10.

Example 4

Figure 12:
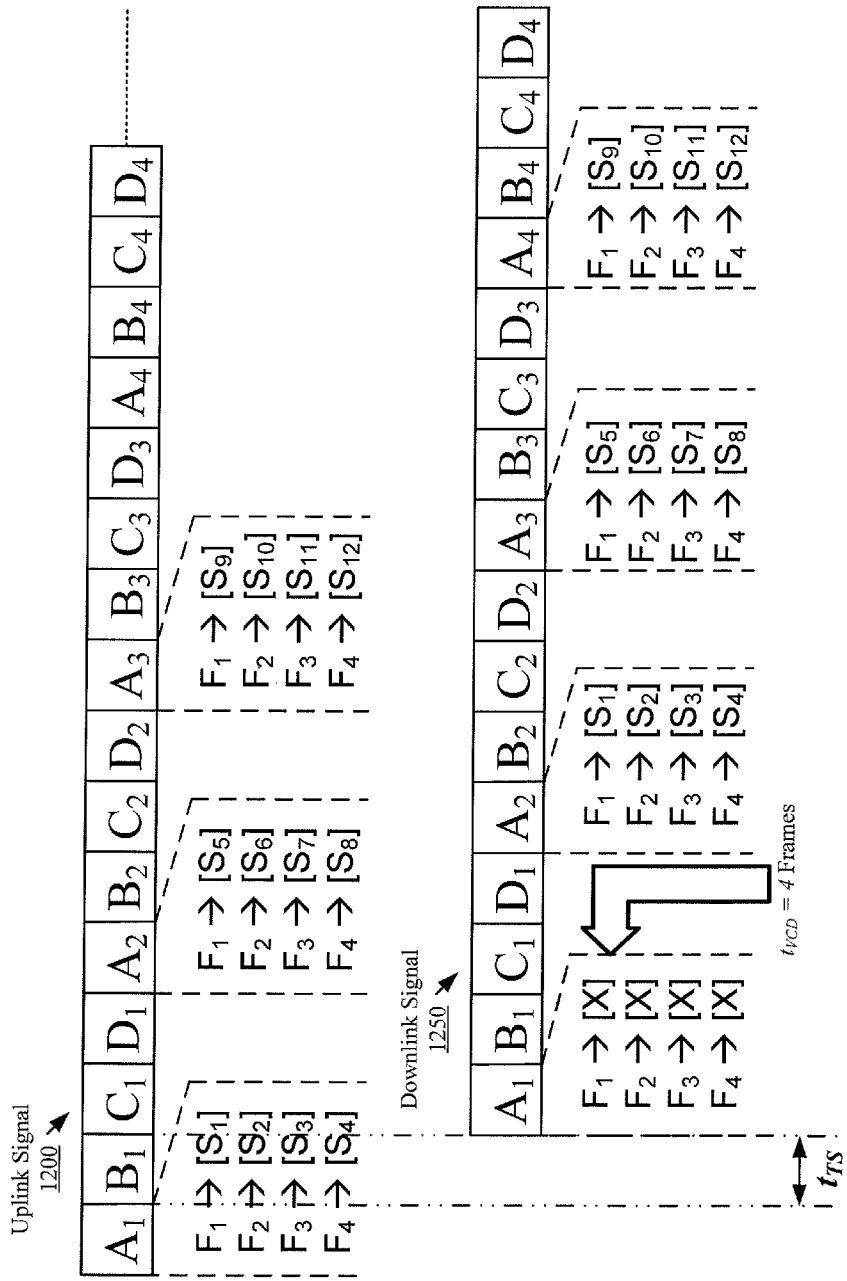

Referring now to FIG. 12, there is provided a schematic illustration of an exemplary uplink signal 1200 and an exemplary downlink signal 1250 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The scenario of FIG. 12 is similar to the scenario of FIG. 10. However, the communication delay $t_{CD}$ of FIG. 12 is set to the duration of four (4) frames, rather than the duration of two (2) frames as shown in FIG. 10.

As evident from the above examples 1-4, the communication delay $t_{CD}$ does not provide a benefit to message communication when errors do not exist in the data of an uplink signal. Still, the benefit received by the communication delay $t_{CD}$ is significant in scenarios where errors exists in the data of an uplink signal. This is evidenced by the following examples 5-8.

Example 5

Figure 13:
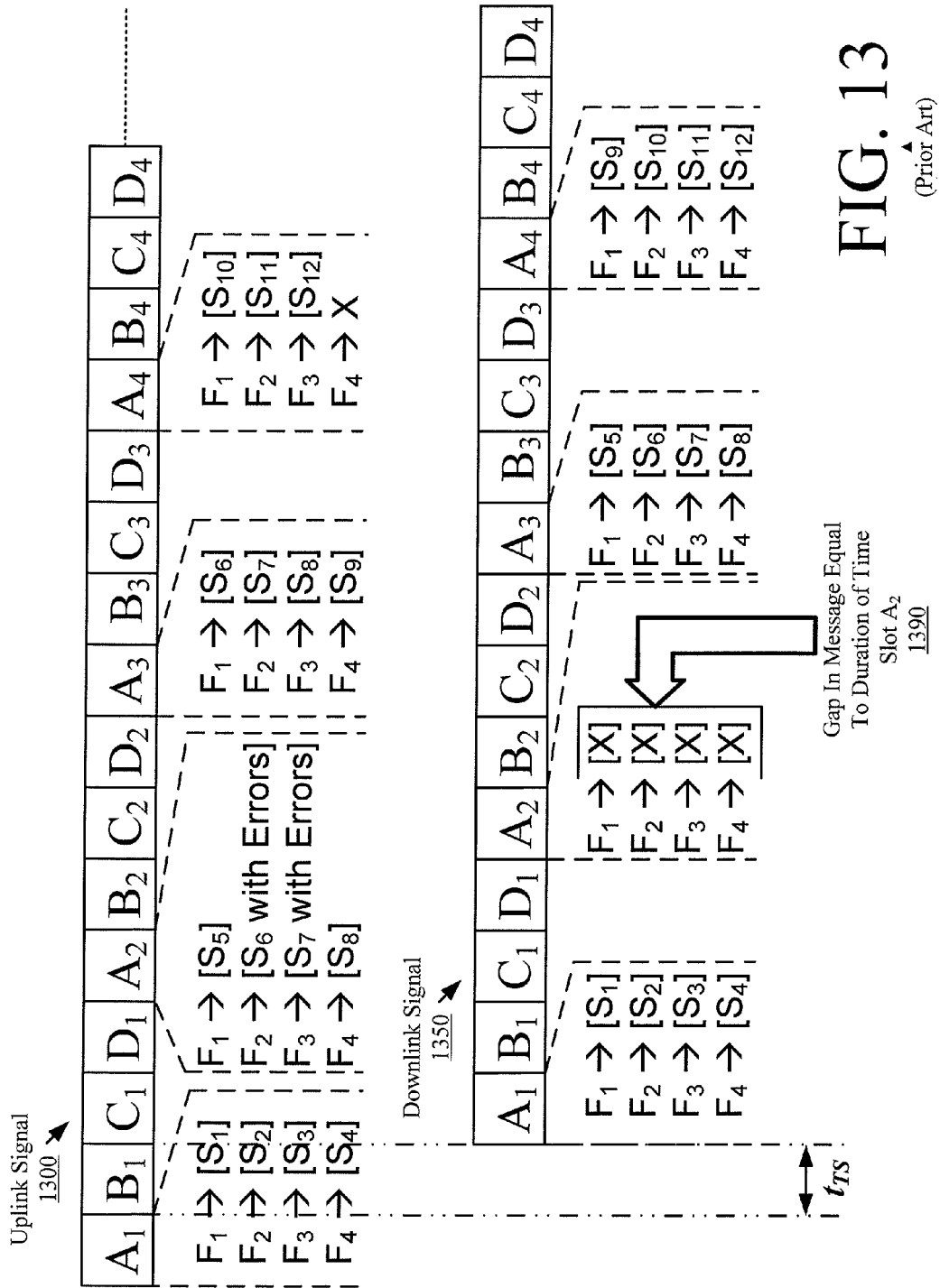
FIG. 13 is a conceptual diagram of uplink and downlink signals generated by a conventional communication system, where errors exist in message data of the uplink signal.

Referring now to FIG. 13, there is provided a schematic illustration of an exemplary uplink signal 1300 and an exemplary downlink signal 1350 that are generated in a conventional communication system implementing a conventional TDMA communication method. The conventional TDMA communication method employs a conventional Hybrid ARQ Type I error control technique. Notably, message data of the uplink signal includes errors.

FIG. 13 is provided to facilitate a comparison of signals generated during a conventional TDMA communication process to signals generated during the improved TDMA communication method of the present invention, where errors exist in the message data of the uplink signals. Signals generated during the improved TDMA communication method of the present invention will be described below in relation to FIGS. 14-16.

Referring again to FIG. 13, the uplink signal 1300 is a TDMA signal communicated from a calling communication device and received at a conventional base station. The downlink signal 1350 is a TDMA signal communicated from the conventional base station to a called communication device. There is an offset $t_{TS}$ between the uplink signal 1300 and the downlink signal 1350.

As shown in FIG. 13, four (4) users share the uplink and downlink channels in the TDMA scheme. Each user is allocated one (1) time slot every four (4) time slots of the uplink and downlink signals 1300, 1350. For example, the user of the calling communication device is allocated time slots $A_1, A_2, A_3, A_4$ of the uplink and downlink signals 1300, 1350. Another user is allocated time slots $B_1, B_2, B_3, B_4$ of the uplink and downlink signals 1300, 1350, and so on.

Each time slot $A_1, A_2, A_3, A_4, B_1, B_2, B_3, B_4, C_1, C_2, C_3, C_4, D_1, D_2, D_3$ includes four frames $F_1, F_2, F_3, F_4$. Each frame $F_1, F_2, F_3$ and $F_4$ can be used to communicate one (1) segment of a message. For example, each time slot $A_1, A_2, A_3, A_4$ of the uplink signal 1300 is used to communicate a respective segment $S_1, S_2, \ldots, S_{12}$ of a twelve (12) segment message.

Notably, errors are introduced into segments $S_6, S_7$ of time slot $A_2$ during transmission thereof. As such, segments $S_6, S_7$ are retransmitted during time slot $A_3$. Also, since the segments must be transmitted in sequential order, segment $S_8$ is also retransmitted in time slot $A_3$ even though errors were not introduced into the segment during the first transmission thereof.

As a consequence of the errors introduced into segments $S_6, S_7$ during transmission thereof, a gap 1390 in the message is introduced by the conventional base station. The gap 1390 has a duration of a time slot $A_2$ of the downlink signal 1350.

Example 6

Figure 14:
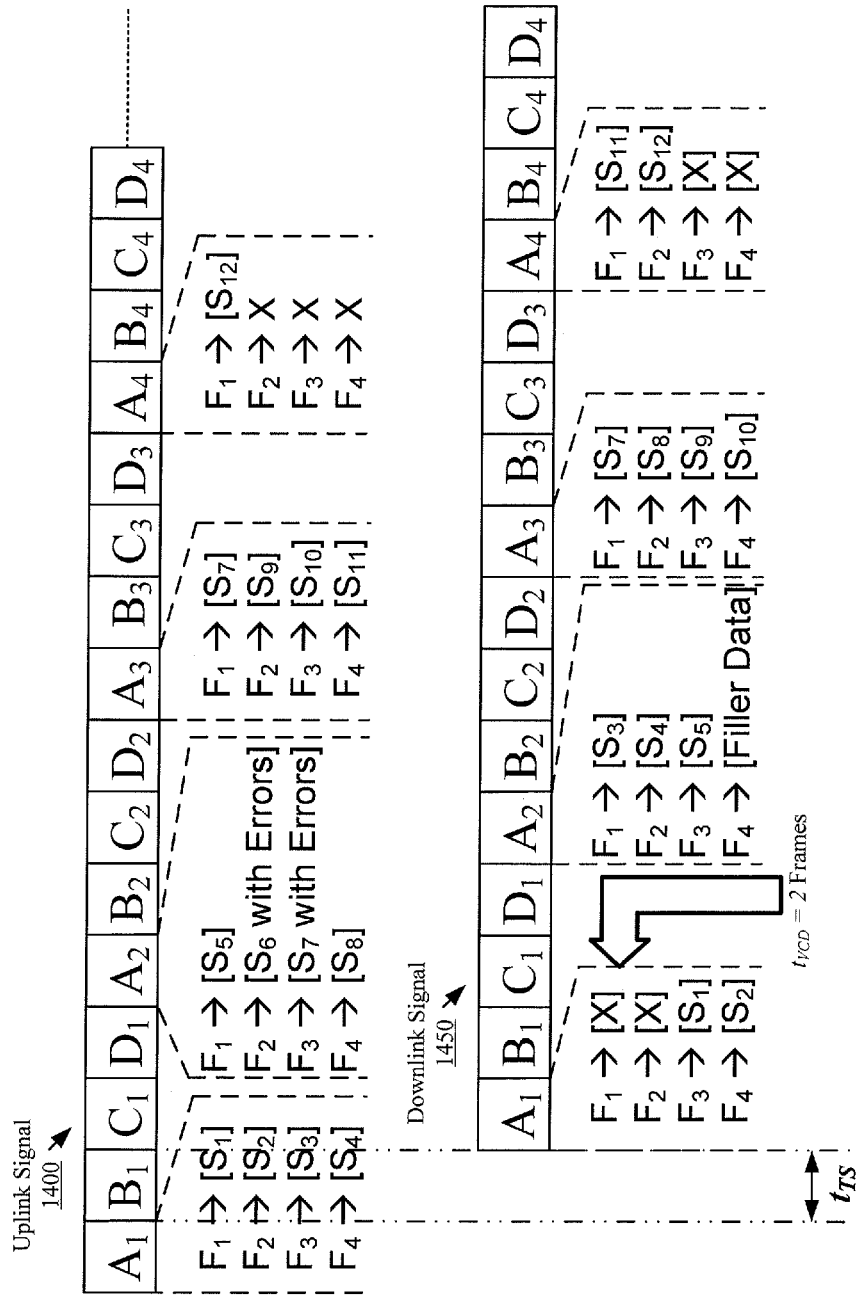
FIGS. 14-16 are conceptual diagrams of exemplary uplink and downlink signals generated in a communication system of the present invention that are useful for understanding scenarios where errors exist in message data of the uplink signals.

Referring now to FIG. 14, there is provided a schematic illustration of an exemplary uplink signal 1400 and an exemplary downlink signal 1450 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The uplink signal 1400 is a TDMA signal communicated from a calling communication device (e.g., the communication device 102 of FIGS. 1-2) and received at a base station (e.g., the base station 104 of FIGS. 1-2). The downlink signal 1450 is a TDMA signal communicated from the base station to a called communication device (e.g., the communication device 106 of FIGS. 1-2). There is an offset $t_{TS}$ between the uplink signal 1400 and the downlink signal 1450.

As shown in FIG. 14, four (4) users share the uplink and downlink channels in the TDMA scheme. Each user is allocated one (1) time slot every four (4) time slots of the uplink and downlink signals 1400, 1450. For example, the user of the calling communication device is allocated time slots $A_1, A_2, A_3, A_4$ of the uplink and downlink signals 1000, 1050. Another user is allocated time slots $B_1, B_2, B_3, B_4$ of the uplink and downlink signals 1000, 1050, and so on.

Each time slot $A_1, A_2, A_3, A_4, B_1, B_2, B_3, B_4, C_1, C_2, C_3, C_4, D_1, D_2, D_3$ includes four frames $F_1, F_2, F_3, F_4$. Each frame $F_1, F_2, F_3$ and $F_4$ can be used to communicate one (1) segment of a message. For example, segments $S_1, S_2, S_3, S_4$ of the message are communicated from the calling communication device to the base station in frames $F_1, F_2, F_3, F_4$ of time slot $A_1$ of the uplink signal 1400. At the base station, the message data of segments $S_1, S_2, S_3, S_4$ is processed to determine if errors exist therein. As shown in FIG. 14, errors do not exist in segments $S_1, S_2, S_3, S_4$ of the message. As such, the base station communicates the segments $S_1, S_2, S_3, S_4$ of the message to the called communication device during time slot $A_1$ of the down link signal 1450.

Thereafter, segments $S_5, S_6, S_7, S_8$ of the message are communicated from the calling communication device to the base station in frames $F_1, F_2, F_3, F_4$ of time slot $A_2$ of the uplink signal 1400. At the base station, a determination is made that errors exist in the message data of segments $S_6$ and $S_7$. Consequently, the base station discards the message data of segments $S_6$ and $S_7$. The base station also selects one or both of the data segments $S_6$ and $S_7$ for retransmission from the calling communication device. The selection is based on the value of the communication delay $t_{CD}$. Since the value of the communication delay $t_{CD}$ is equal to the duration of two (2) frames, the data associated with segments $S_3, S_4, S_5$ and $S_6$ is to be transmitted in time slot $A_2$ of the downlink signal 1450. As such, the base station requests retransmission of segment $S_7$ only. The base station also communicates error free message data of segments $S_3$, $S_4$ and $S_5$ in time slots $F_1$, $F_2$ and $F_3$ of time slot $A_2$ of the downlink signal 1450. Notably, the message data of segment $S_6$ is not communicated in time slot $F_4$ of time slot $A_2$ of the downlink signal 1450. Rather, filler data is communicated in time slot $F_4$ of time slot $A_2$ of the downlink signal 1450.

Shortly thereafter, segments $S_7$, $S_9$, $S_{10}$ and $S_{11}$ of the message are communicated from the calling communication device to the base station in frames $F_1$, $F_2$, $F_3$, $F_4$ of time slot $A_3$ of the uplink signal 1400. Notably, $S_8$ is not retransmitted in the present invention. However, $S_8$ is retransmitted in the prior art, as shown by FIG. 13. The difference in the retransmission of $S_8$ is due to the following reasons. In the prior art, data is voice data. The voice data is sent sequentially in the downlink transmission. There are three (3) choices in the downlink transmission for data with errors: repeat, interpolate or mute. In this example, the downlink action is request and repeat. In the prior art, there is no communication delay $t_{CD}$ added because the base station cannot measure and predict the channel conditions, so in the downlink transmission, the base station has to request the data to be sent again which is one (1) time slot. In the prior art, the base station cannot update per frame only per slot, so it repeats all the frames in the slot.

At the base station, a determination is made that the message data of segments $S_7$, $S_9$, $S_{10}$ and $S_{11}$ is error free. As such, the base station communicates the segments $S_7$, $S_8$, $S_9$ and $S_{10}$ of the message to the called communication device during time slot $A_3$ of the down link signal 1450.

The last segment $S_{12}$ of the message is communicated from the calling communication device to the base station in frames $F_1$ of time slot $A_4$ of the uplink signal 1400. At the base station, a determination is made that the message data of segment $S_{12}$ is error free. Consequently, the base station communicates the segments $S_{11}$ and $S_{12}$ of the message to the called communication device during frames $F_1$, $F_2$ of time slot $A_4$ of the down link signal 1450. Frames $F_3$, $F_4$ of time slot $A_4$ of the down link signal 1450 are unused.

Notably, the gap introduced in the message by the base station of the present invention is substantially smaller as compared to the gap 1390 introduced in a message by a conventional base station. In this regard, it should be understood that the gap of FIG. 14 is evidenced by the filler data communicated in time slot $F_4$ of time slot $A_2$ of the downlink signal 1450. The gap of FIG. 14 has a duration of a frame of a time slot. In contrast, the gap 1390 in FIG. 13 has a duration of a time slot.

Example 7

Figure 15:
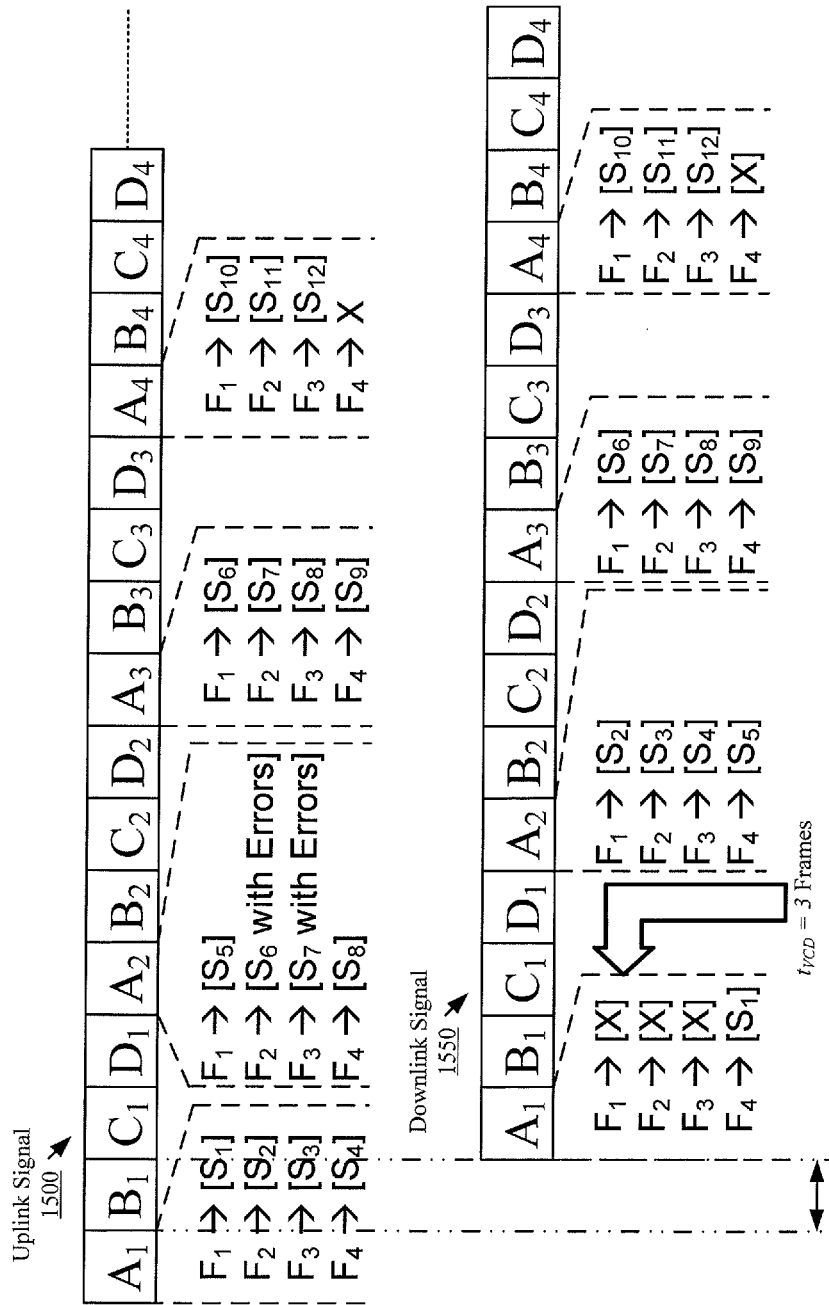

Referring now to FIG. 15, there is provided a schematic illustration of an exemplary uplink signal 1500 and an exemplary downlink signal 1550 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The scenario of FIG. 15 is similar to the scenario of FIG. 14. However, the communication delay $t_{CD}$ of FIG. 15 is set to the duration of three (3) frames, rather than the duration of two (2) frames as shown in FIG. 14. Notably, in FIG. 15, a gap in the message is not introduced by the base station.

Example 8

Figure 16:
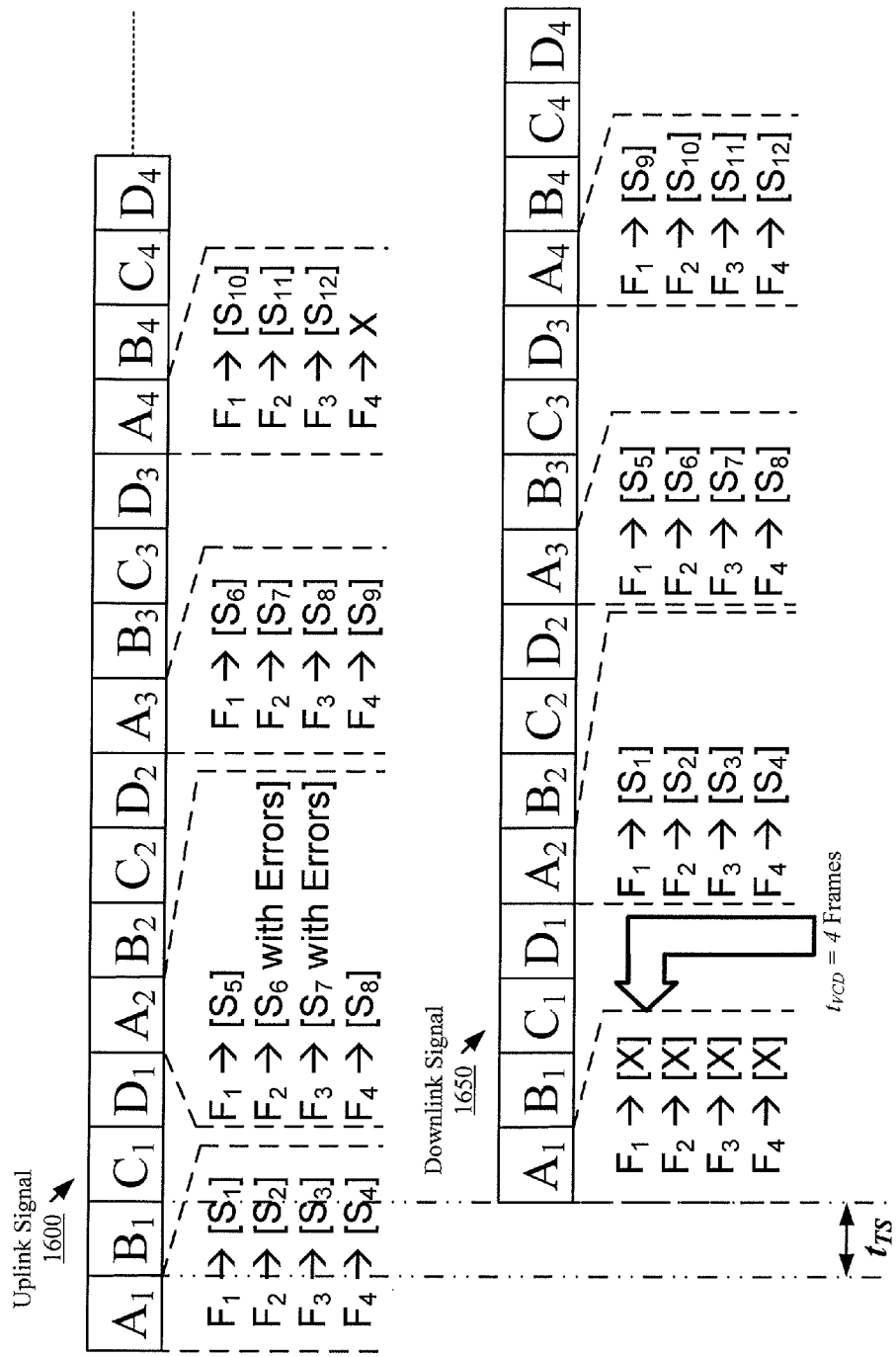

Referring now to FIG. 16, there is provided a schematic illustration of an exemplary uplink signal 1600 and an exemplary downlink signal 1650 that are generated in a communication system of the present invention (e.g., the communication system 100 of FIG. 1 or 200 of FIG. 2) implementing the TDMA communication method of FIG. 6 and the Hybrid ARQ Type I error correction method of FIG. 7. The scenario of FIG. 16 is similar to the scenario of FIG. 14. However, the communication delay $t_{CD}$ of FIG. 16 is set to the duration of four (4) frames, rather than the duration of two (2) frames as shown in FIG. 14. Notably, in FIG. 16, a gap in the message is not introduced by the base station.

In view of the forgoing examples 5-8, the communication delay $t_{CD}$ provides a significant benefit to message communication when errors are introduced in the data of an uplink signal. The benefits are at least partially evidenced by the fact that the gap 1390 of FIG. 13 is reduced or eliminated in the present invention. One can appreciate that the reduction or elimination of gap 1390 is desirable in many data communication applications, such as speech communication application. In speech communication application, the present invention provides improved voice quality as compared to that of conventional communication systems.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for providing Time Division Multiple Access (TDMA) communication in a communication system, comprising:

determining, at a network node of said communication system, a channel quality of an uplink channel;

selecting an integer value "K" based on a value of said channel quality, where said integer value "K" is less than or equal to a total number of frames "N" of a time slot of a TDMA signal;

setting a value of a communication delay "d" equal to said integer value "K";

receiving, at said network node, first message data communicated over said uplink channel in a first time slot of an uplink signal;

performing an error control process using said first message data to at least identify first error free message data; and communicating from said network node at least one of first filler data and at least a first portion of said first error free message data over a downlink channel in a last "N–K" frames of a first time slot of a downlink signal when said integer value "K" is less than "N", where a first "K" frames of said first time slot of said downlink signal are unused;

wherein said integer value "K" is dynamically selected based on anticipated temporary interruptions associated with obtaining error free data over said uplink channel while using said error control process with said channel quality as determined, and the communication delay "d" will have a duration which reduces or eliminates a gap in subsequent transmissions of data on the downlink channel which would otherwise be caused by said anticipated temporary interruptions.

2. A method for providing Time Division Multiple Access (TDMA) communication in a communication system, comprising:
   determining, at a network node of said communication system, a channel quality of an uplink channel;
   selecting an integer value "K" based on a value of said channel quality, where said integer value "K" is less than or equal to a total number of frames "N" of a time slot of a TDMA signal;
   setting a value of a communication delay "d" equal to said integer value "K";
   receiving, at said network node, first message data communicated over said uplink channel in a first time slot of an uplink signal;
   performing an error control process using said first message data to at least identify first error free message data;
   communicating from said network node at least one of first filler data and at least a first portion of said first error free message data over a downlink channel in a last "N−K" frames of a first time slot of a downlink signal when said integer value "K" is less than "N", where a first "K" frames of said first time slot of said downlink signal are unused; and
   communicating at least one of said first filler data and said first error free message data over said downlink channel in a second time slot of said downlink signal when said integer value "K" is equal to "N".

3. The method according to claim 1, wherein said determining step is performed at a physical layer of said communication system.

4. The method according to claim 1, further comprising comparing said value for said channel quality to a threshold value.

5. A method for providing Time Division Multiple Access (TDMA) communication in a communication system, comprising:
   determining, at a network node of said communication system, a channel quality of an uplink channel;
   selecting an integer value "K" based on a value of said channel quality, where said integer value "K" is less than or equal to a total number of frames "N" of a time slot of a TDMA signal;
   setting a value of a communication delay "d" equal to said integer value "K";
   receiving, at said network node, first message data communicated over said uplink channel in a first time slot of an uplink signal;
   performing an error control process using said first message data to at least identify first error free message data;
   communicating from said network node at least one of first filler data and at least a first portion of said first error free message data over a downlink channel in a last "N−K" frames of a first time slot of a downlink signal when said integer value "K" is less than "N", where a first "K" frames of said first time slot of said downlink signal are unused;
   comparing said value for said channel quality to a threshold value; and
   setting said integer value "K" equal to a first value when said value for said channel quality is less than said threshold value; and
   setting said integer value "K" equal to a second value when said value for said channel quality is greater than said threshold value.

6. The method according to claim 5, further comprising selecting said first value to be larger than said second value.

7. The method according to claim 1, further comprising selecting said error control process to be an Automatic Repeat Request error control process.

8. The method according to claim 1, wherein said error control process comprises selecting at least one segment of said first message data for retransmission over said uplink channel based on at least one parameter selected from the group consisting of a bandwidth, said communication delay "d", a total number of frames of a time slot of said down link signals, and said channel quality.

9. The method according to claim 1, further comprising:
   receiving, at said network node, second message data communicated over said uplink channel in a second time slot of said uplink signal;
   performing said error control process using said second message data to at least identify second error free message data; and
   communicating at least one of second filler data, a second portion of said first error free message data and a first portion of said second error free message data over said downlink channel in a second time slot of said downlink signal.

10. The method according to claim 9, further comprising:
    receiving, at said network node, third message data communicated over said uplink channel in a third time slot of said uplink signal;
    performing said error control process using said third message data to at least identify third error free message data; and
    communicating at least one of third filler data, a second portion of said second error free message data and a first portion of said third error free message data over said downlink channel in a third time slot of said downlink signal.

11. The method according to claim 10, further comprising communicating a second portion of said third error free message data over said downlink channel in a fourth time slot of said downlink signal.

12. The method according to claim 11, wherein at least one frame of said fourth time slot of said downlink signal is unused.

13. A system, comprising:
    a receiver for receiving a message communicated over an uplink channel;
    at least one processor;
    a memory having instructions stored thereon for causing said processor to:
       determine a channel quality of said uplink channel;
       select an integer value "K" based on a value of said channel quality, where said integer value "K" is less than or equal to a total number of frames "N" of a time slot of a TDMA signal;
       set a value of a communication delay "d" equal to said integer value "K";
       perform an error control process using first message data of said message to at least identify first error free message data; and
    a transmitter for communicating at least one of first filler data and at least a first portion of said first error free message data over a downlink channel in a last "N−K" frames of a first time slot of a downlink signal when said integer value "K" is less than "N";
    wherein a first "K" frames of said first time slot of said downlink signal are unused, and said integer value "K" is selected so that the communication delay "d" will have a duration which reduces or eliminates a gap that is otherwise introduced in a communication by the network node as a result of said error control process.

14. The system according to claim 13, wherein said transmitter is further configured for communicating at least one of said first filler data and said first error free message data over said downlink channel in a second time slot of said downlink signal when said integer value "K" is equal to "N".

15. The system according to claim 13, wherein said channel quality is determined at a physical layer of said system.

16. The system according to claim 13, wherein said instructions are further configured for causing said processor to compare said value for said channel quality to a threshold value.

17. The system according to claim 16, wherein said instructions are further configured for causing said processor to:
set said integer value "K" equal to a first value when said value for said channel quality is less than said threshold value; and
set said integer value "K" equal to a second value when said value for said channel quality is greater than said threshold value.

18. The system according to claim 17, wherein said first value is larger than said second value.

19. The system according to claim 13, wherein said error control process is an Automatic Repeat Request error control process.

20. The system according to claim 13, wherein said error control process comprises selecting at least one segment of said first message data for retransmission over said uplink channel based on at least one parameter selected from the group consisting of a bandwidth, said communication delay "d", a total number of frames in a time slot of said downlink signal, and said channel quality.

21. The system according to claim 13, wherein:
said instructions are further configured for causing said processor to perform said error control process using second message data to at least identify second error free message data; and
said transmitter is further configured for communicating at least one of second filler data, a second portion of said first error free message data and a first portion of said second error free message data over said downlink channel in a second time slot of said downlink signal.

22. The system according to claim 21, wherein:
said instructions are further configured for causing said processor to perform said error control process using third message data to at least identify third error free message data; and
said transmitter is further configured for communicating at least one of third filler data, a second portion of said second error free message data and a first portion of said third error free message data over said downlink channel in a third time slot of said downlink signal.

23. The system according to claim 22, wherein said transmitter is further configured for communicating a second portion of said third error free message data in a fourth time slot of said downlink signal.

24. The system according to claim 23, wherein at least one frame of said fourth time slot of said downlink signal is unused.

* * * * *